United States Patent
Iida et al.

(10) Patent No.: US 9,103,396 B2
(45) Date of Patent: Aug. 11, 2015

(54) BALANCER DEVICE FOR PARALLEL TWIN CYLINDER INTERNAL COMBUSTION ENGINE

(71) Applicant: HONDA MOTOR CO., LTD., Tokyo (JP)

(72) Inventors: Akihiro Iida, Wako (JP); Hiroto Takeichi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/036,065

(22) Filed: Sep. 25, 2013

(65) Prior Publication Data
US 2014/0123928 A1 May 8, 2014

(30) Foreign Application Priority Data
Nov. 8, 2012 (JP) .................. 2012-246108

(51) Int. Cl.
F02B 75/06 (2006.01)
F16F 7/10 (2006.01)
F16F 15/26 (2006.01)

(52) U.S. Cl.
CPC .......... *F16F 7/10* (2013.01); *F16F 15/265* (2013.01)

(58) Field of Classification Search
CPC ......... F16F 15/265; F16F 15/264; F16F 7/10; F16F 15/24; F16F 15/22; F16F 15/26; F02B 2075/025; F02B 75/28; F02B 25/08; F02B 75/20; F02B 75/246

USPC ........................... 123/192.1, 192.2
See application file for complete search history.

(56) References Cited

U.S. PATENT DOCUMENTS

| | | | | |
|---|---|---|---|---|
| 2,304,892 A * | 12/1942 | Dickson | ........................ | 74/604 |
| 2,628,765 A * | 2/1953 | Anderson | .................... | 417/419 |
| 4,290,395 A * | 9/1981 | Sakano et al. | ............. | 123/192.2 |
| 4,414,934 A * | 11/1983 | Vogl et al. | .................. | 123/192.2 |
| 4,509,474 A * | 4/1985 | Schmuck | ................... | 123/192.2 |
| 6,439,188 B1 * | 8/2002 | Davis | ......................... | 123/193.2 |
| 8,720,403 B2 * | 5/2014 | Yano et al. | ................. | 123/192.2 |
| 8,783,222 B2 * | 7/2014 | Anton et al. | ................ | 123/192.2 |
| 2001/0023676 A1 * | 9/2001 | Takano et al. | ............. | 123/192.2 |
| 2008/0168898 A1 * | 7/2008 | Hardin et al. | ................. | 92/153 |
| 2009/0211550 A1 * | 8/2009 | Okamoto et al. | ......... | 123/192.2 |
| 2011/0073060 A1 * | 3/2011 | Morgan et al. | ............ | 123/192.2 |
| 2012/0055438 A1 * | 3/2012 | Yano et al. | ................. | 123/192.2 |
| 2013/0025558 A1 * | 1/2013 | Nagahashi et al. | ........ | 123/192.2 |

FOREIGN PATENT DOCUMENTS

JP     2011-043189 A     3/2011

* cited by examiner

*Primary Examiner* — Marguerite McMahon
*Assistant Examiner* — Tea Holbrook
(74) *Attorney, Agent, or Firm* — Squire Patton Boggs (US) LLP

(57) ABSTRACT

A device is provided for reducing first cylinder vibratory force F1 and second cylinder vibratory force F2 which are generated when a crankshaft is rotated, in a parallel twin cylinder internal combustion engine in which a crankshaft is provided with a first crankpin and a second crankpin at a predetermined phase angle and a cylinder block is formed with a first cylinder and a second cylinder.

12 Claims, 13 Drawing Sheets

(A)

(B)

BALANCER DEVICE FOR PARALLEL TWIN CYLINDER INTERNAL COMBUSTION ENGINE

BACKGROUND

1. Field

The present invention relates to a balancer device for a parallel twin cylinder internal combustion engine.

2. Description of Related Art

Patent Literature 1 (JP-A No. 2011-43189) discloses a primary balancer device (hereinafter called a balancer device) provided in an internal combustion engine including a plurality of cylinders. The balancer device is configured to reduce a primary vibration generated with the same rotational period as a crankshaft, out of vibrations caused by rotation of the crankshaft.

The balancer device according to Patent Literature 1 is configured in such a manner that a balancer weight (balancer) is provided on balancer shafts, and two balancer shafts are used. Such a balancer device is generally called a biaxial primary balancer.

It is publicly known that in the case of a parallel twin cylinder internal combustion engine, if crank phase angles are set at regular intervals, vibration resulting from inertial force included in a primary vibration, or vibration resulting from couple, can be canceled by the crankshaft itself, thereby facilitating setting of the balancer device (arrangement or the like of the balancer).

However, in order to characterize the output characteristics (torque variation or the like) of the parallel twin cylinder internal combustion engine, the crank phase angles are set at irregular intervals (for example, a 270-degree phase crank), complex vibration with inertial force or couple out of the primary vibration included, thereby increasing restrictions on setting of the balancer device. As a result, the balancer occupies most of a space in a crankcase, and restrictions may be imposed on setting of the parallel twin cylinder internal combustion engine.

SUMMARY

Embodiments of the present invention have been made in view of the foregoing, and an object of the present invention is to provide a balancer device for a parallel twin cylinder internal combustion engine, configured to improve the degree of freedom in layout of a balancer while appropriately reducing a primary vibration, so that the degree of freedom in layout of the parallel twin cylinder internal combustion engine is improved.

In order to address the above-mentioned problem, according to an embodiment of the invention, there is provided a balancer device for a parallel twin cylinder internal combustion engine in which a common crankshaft is provided with a first crankpin and a second crankpin at a predetermined phase angle. A cylinder block is formed with a first cylinder corresponding to the first crankpin and a second cylinder corresponding to the second crankpin.

The balancer device for the parallel twin cylinder internal combustion engine can be configured to reduce first cylinder vibratory force and second cylinder vibratory force which are generated when the crankshaft is rotated. The first cylinder vibratory force generates force directed outward in a radial direction of the crankshaft while performing inverse rotation with the same period as the crankshaft based on a position where a first piston stored in the first cylinder is at a top dead center. The second cylinder vibratory force generates force directed outward in the radial direction of the crankshaft while performing the inverse rotation with the same period as the crankshaft based on a position where a second piston stored in the second cylinder is at the top dead center.

When viewed in an axial direction of the crankshaft, a straight line for bisecting an angle formed between the first cylinder vibratory force and the second cylinder vibratory force is defined as an angle bisector. Force with the first cylinder vibratory force and the second cylinder vibratory force resolved in a direction parallel to the angle bisector is defined as an inertial force component. Force with the first cylinder vibratory force and the second cylinder vibratory force resolved in a direction parallel to a plane perpendicular to the angle bisector is defined as a couple component. An inertial force balancer is provided for generating force facing the inertial force component, and a couple balancer is provided for generating force facing the couple component.

According to another embodiment of the invention, the inertial force balancer is composed of the first inertial force balancer and the second inertial force balancer which have the equal amount of unbalance. The crankshaft is arranged along a width direction of the parallel twin cylinder internal combustion engine. In a planar view, the first inertial force balancer and the second inertial force balancer are arranged symmetrically with a bisection point positioned around the center of the crankshaft as the center, on a plane that bisects a segment for connecting the center of the first cylinder to the center of the second cylinder and that is perpendicular to the segment. The couple balancer is configured in such a manner that the first couple balancer and the second couple balancer are arranged coaxially with each other, and also are symmetrical at 180 degrees about the shaft.

According to another embodiment of the invention, at least any one of the first inertial force balancer, the second inertial force balancer, the first couple balancer and the second couple balancer is arranged outside of a crankcase.

According to another embodiment of the invention, at least either one of the first inertial force balancer and the second inertial force balancer is arranged outside of the crankcase. A drive shaft of at least either one of the first inertial force balancer and the second inertial force balancer that are arranged outside is supported by a side surface of the crankcase and a crankcase cover for covering the side surface of the crankcase.

According to another embodiment of the invention, a combined balancer is composed by combining one of the first inertial force balancer and the second inertial force balancer with one of the first couple balancer and the second couple balancer. In the planar view, the other of the first inertial force balancer and the second inertial force balancer, and the combined balancer are arranged symmetrically with the bisection point positioned around the center of the crankshaft as the center, on the plane that bisects the segment for connecting the center of the first cylinder to the center of the second cylinder and that is perpendicular to the segment.

According to another embodiment of the invention, the other of the first couple balancer and the second couple balancer, and the combined balancer are arranged coaxially with each other.

According to another embodiment of the invention, after an axial position of one of the first couple balancer and the second couple balancer is preliminarily determined, one of the first inertial force balancer and the second inertial force balancer is combined with one of the first couple balancer and the second couple balancer, and a phase of the combined balancer with respect to the other of the first couple balancer and the second couple balancer is set.

According to another embodiment of the invention, the combined balancer, and at least one of the other of the first inertial force balancer and the second inertial force balancer and the other of the first couple balancer and the second couple balancer are arranged outside of the crankcase.

According to another embodiment of the invention, the other of the first inertial force balancer and the second inertial force balancer is arranged outside of the crankcase, and the drive shaft of the other of the first inertial force balancer and the second inertial force balancer is supported by the side surface of the crankcase and the crankcase cover for covering the side surface of the crankcase.

According to another embodiment of the invention, the combined balancer, and the other of the first couple balancer and the second couple balancer are arranged outside of the crankcase. The combined balancer, and the other of the first couple balancer and the second couple balancer are arranged coaxially with each other. The combined balancer, and either one of the other of the first couple balancer and the second couple balancer are formed integrally with a drive shaft thereof, and the other thereof is separately fixed to the drive shaft by a fastening member.

According to another embodiment of the invention, the crankcase has a vertically divided structure. The drive shaft of the other of the first inertial force balancer and the second inertial force balancer is arranged in an upper half body of the crankcase. The drive shaft of the combined balancer and the other of the first couple balancer and the second couple balancer is arranged in a lower half body of the crankcase.

According to another embodiment of the invention, the drive shaft of the other of the first inertial force balancer and the second inertial force balancer is arranged behind the crankshaft. The drive shaft of the combined balancer and the other of the first couple balancer and the second couple balancer is arranged in front of the crankshaft.

Since the vibratory force of the primary vibration generated with the same period as the rotation of the crankshaft is resolved into two directions, that is, into the inertial force component and the couple component, and the inertial force balancer and the couple balancer are set to face the inertial force component and the couple component, the primary vibration is reduced in certain embodiments.

Also, if the internal force balancer satisfies conditions that the inertial force balancer faces the inertial force component and the inertial force component is reduced and the couple balancer satisfies conditions that the couple balancer faces the couple component and the couple component is reduced, setting of mass and layout of the respective balancers are comparatively flexibly performed, and the degree of freedom in layout of the respective balancers is improved. As a result, the degree of freedom in layout of the parallel twin cylinder internal combustion engine is improved.

In certain embodiments, the two inertial force balancers have mutually different short drive shafts, and the drive shafts of the balancers are prevented from occupying the internal space in the parallel twin cylinder internal combustion engine (crankcase). As a result, the degree of freedom in layout of the parallel twin cylinder internal combustion engine is improved. Also, if in the two couple balancers, force facing the couple component is generated in a symmetrical relation through 180 degrees, mass is changed to adjust the layout. As a result, the degree of freedom in layout of the parallel twin cylinder internal combustion engine is improved.

In certain embodiments, since at least any one of the first inertial force balancer, the second inertial force balancer, the first couple balancer and the second couple balancer is arranged outside of the crankcase, the occupation of the internal space in the parallel twin cylinder internal combustion engine (crankcase) by the balancer is suppressed. Downsizing of the parallel twin cylinder internal combustion engine is achieved by, for example, bringing shaft members of a transmission, a starter or the like close to the crankshaft. As a result, the degree of freedom in layout of the parallel twin cylinder internal combustion engine is improved.

In certain embodiment, since the occupation of the internal space in the parallel twin cylinder internal combustion engine (crankcase) by the balancer arranged outside of the crankcase and the drive shaft of the balancer is suppressed, and for example, the shaft members of the transmission, the starter or the like are reliably easily brought close to the crankshaft, the downsizing of the parallel twin cylinder internal combustion engine is reliably performed. As a result, the degree of freedom in layout of the parallel twin cylinder internal combustion engine is reliably improved.

In certain embodiments, since the primary vibration is reduced by the three balancers, the occupation of the internal space in the parallel twin cylinder internal combustion engine by the drive shaft of the uncombined inertial force balancer is suppressed by shortening the drive shaft, and for example, the downsizing of the parallel twin cylinder internal combustion engine is performed by bringing the shaft members of the transmission, the starter or the like close to the crankshaft. As a result, the degree of freedom in layout of the parallel twin cylinder internal combustion engine is improved.

In certain embodiments, the primary vibration is properly reduced by coaxially arranging the uncombined couple balancer and the combined balancer with each other, the number of components is suppressed by using the common shaft for the coaxially-arranged balancers, and a drive force transmission media such as a gear and a chain with respect to the balancers on the common shafts is made common. As a result, a structure is simplified.

In certain embodiments, since the mass of one of the two couple balancers composing the combined balancer is increased or reduced according to a position in the axial direction thereof, the phase of the combined balancer (the phase of the center of gravity) is changed according to the mass of the one of the two couple balancers composing the combined balancer. Therefore, after the axial position of one of the first couple balancer and the second couple balancer is preliminarily determined, one of the first inertial force balancer and the second inertial force balancer is combined with one of the first couple balancer and the second couple balancer and the phase of the combined balancer with respect to the other of the first couple balancer and the second couple balancer is set, thereby appropriately reducing the primary vibration.

In certain embodiments, since the combined balancer, and at least one of the other of the first inertial force balancer and the second inertial force balancer and the other of the first couple balancer and the second couple balancer are arranged outside of the crankcase, the occupation of the internal space in the parallel twin cylinder internal combustion engine (crankcase) by the balancers is suppressed, and for example, the downsizing of the parallel twin cylinder internal combustion engine is achieved by, for example, bringing the shaft members of the transmission, the starter or the like close to the crankshaft. As a result, the degree of freedom in layout of the parallel twin cylinder internal combustion engine is improved.

In certain embodiments, since the occupation of the internal space in the parallel twin cylinder internal combustion engine (crankcase) by the balancer arranged outside of the crankcase and the drive shaft of the balancer is suppressed and for example, the shaft members of the transmission, the starter or the like are reliably brought close to the crankshaft, the downsizing of the parallel twin cylinder internal combustion engine is reliably achieved. As a result, the degree of freedom in layout of the parallel twin cylinder internal combustion engine is reliably improved.

In certain embodiments, since the combined balancer, and the other of the first couple balancer and the second couple balancer which are coaxially arranged with each other are arranged outside of the crankcase, the occupation of the internal space in the parallel twin cylinder internal combustion engine (crankcase) by the balancers is suppressed, and since the combined balancer, and the other of the first couple balancer and the second couple balancer are formed separately from each other, handleability and assemblability are improved.

In certain embodiments, since the other of the first inertial force balancer and the second inertial force balancer with the drive shafts thereof shortened is arranged in the upper half body of the crankcase and the occupation of the internal space in the crankcase is suppressed, the upper portion of the crankcase is downsized. Also, since the space for arranging the components for the transmission, the starter or the like is easily ensured in the upper portion of the crankcase, the degree of freedom in layout of the parallel twin cylinder internal combustion engine is improved.

In certain embodiments, since the occupation of the internal space behind the crankshaft is suppressed by arranging the drive shaft of the other of the first inertial force balancer and the second inertial force balancer with the drive shafts shortened behind the crankshaft, for example, the shaft members of the transmission, the starter or the like are easily brought close to the crankshaft.

DETAILED DESCRIPTION

Figure 1:
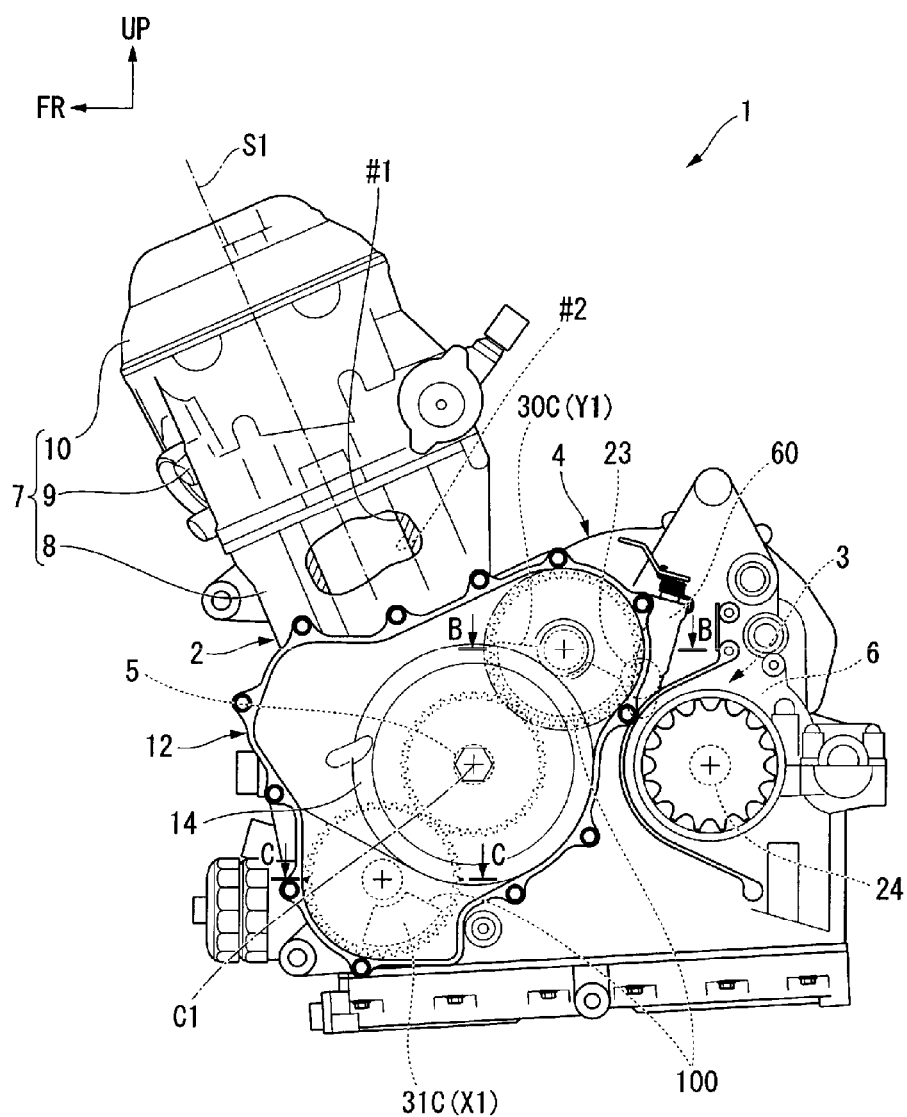
FIG. 1 is a left side view of a vehicle engine including a balancer device for a parallel twin cylinder internal combustion engine according to a first embodiment of the present invention.

Hereinafter, embodiments of the present invention will be described.

In the drawings, an arrow FR is indicative of a front side of an engine (in the following explanation, called a vehicle engine 1), an arrow UP is indicative of an upper side of the engine, and an arrow LH is indicative of a left side of the engine. In the following explanation, a direction along the arrow FR is called a longitudinal direction, a direction along the arrow UP is called a vertical direction, and a direction along the arrow LH is called a horizontal direction or an engine width direction. Note that a direction of a balancer device for a parallel twin cylinder internal combustion engine according to the embodiment will be described using a direction of the engine.

Figure 2:
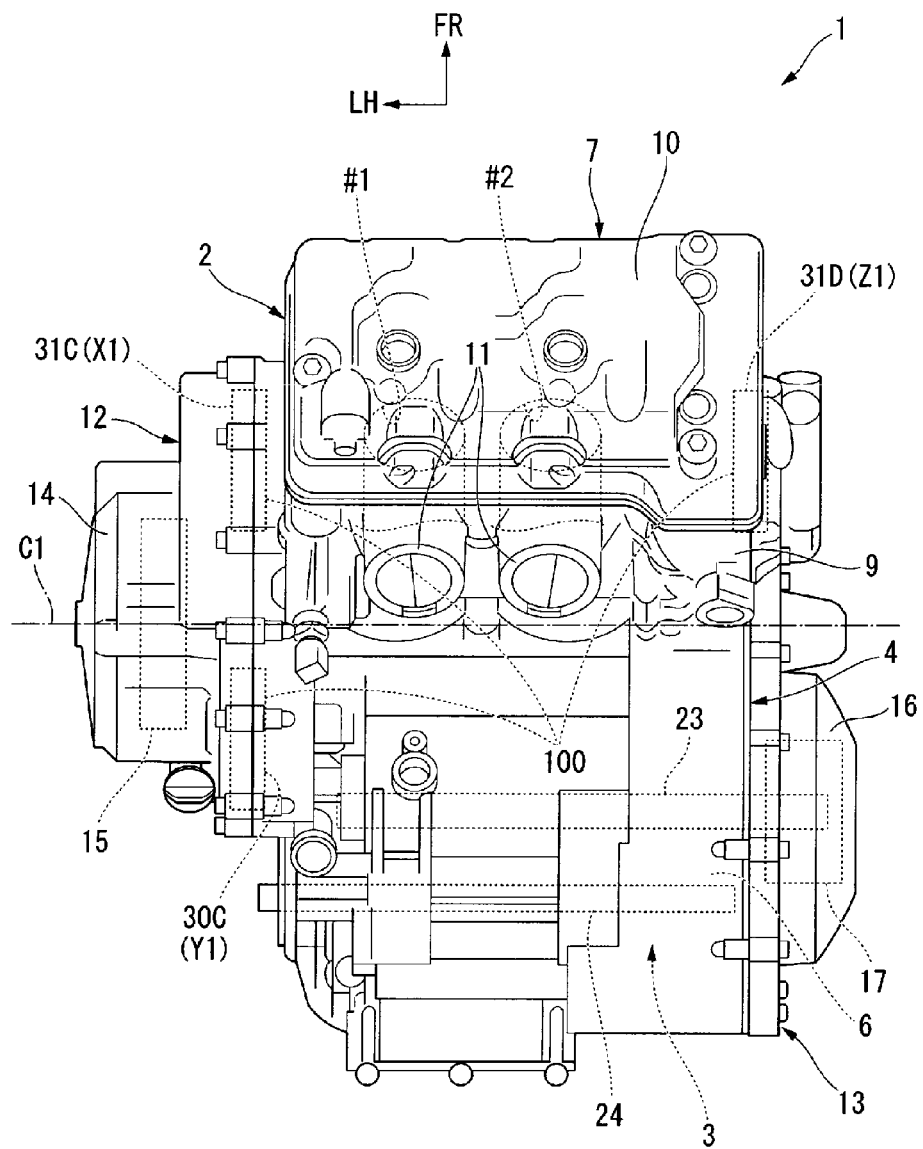
FIG. 2 is a plan view of the vehicle engine according to the first embodiment.

With reference to a first embodiment and FIG. 1 and FIG. 2, the vehicle engine 1 includes a crankcase 4 provided for combining an internal combustion engine 2 formed in front of the vehicle engine with a transmission 3 arranged behind the internal combustion engine 2. In a front internal portion of the crankcase 4, a crankshaft 5 is stored along the engine width direction, a transmission chamber 6 is formed behind the crankshaft 5 inside of the crankcase 4, and the transmission 3 is stored in the transmission chamber 6. A reference sign C1 in the drawing is indicative of a crank axis of the crankshaft 5.

Figure 8:
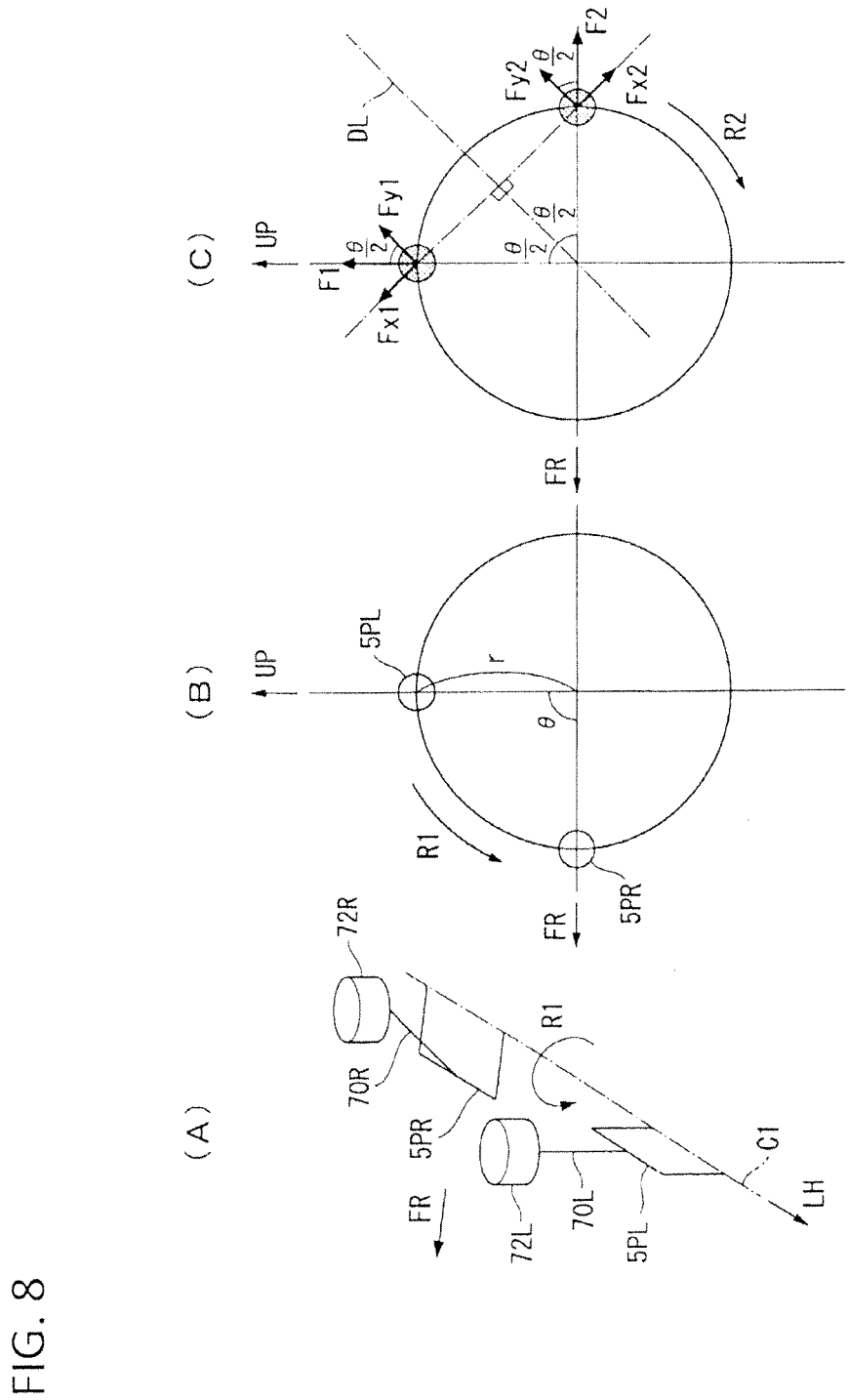
FIG. 8 is a view illustrating a phase angle of a crankpin in the vehicle engine according to the first embodiment and vibratory force generated in the vehicle engine, (A) is a pattern diagram of the crankpin or the like, (B) is a view illustrating a position of the crankpin around a crankshaft, and (C) is a view illustrating the vibratory force generated around the crankshaft.

In this embodiment, the vehicle engine 1 is a parallel twin cylinder engine, and a cylinder 7 is disposed upright on the front upper surface of the crankcase 4 so that a cylinder axis S1 of the cylinder is inclined slightly forward with respect to the vertical direction. The cylinder 7 is formed with a first cylinder #1 and a second cylinder #2 which are juxtaposed in the engine width direction, and a piston 72L and a piston 72R which will be described below (see FIG. 8) are slidably stored in these first cylinder #1 and second cylinder #2.

Piston 72L and piston 72R are respectively connected to the crankshaft 5 through a left connecting rod 70L and a right connecting rod 70R which will be described below, and driving force is generated by converting reciprocation of the piston 72L and the piston 72R into rotational motion by the crankshaft 5. In the embodiment, the internal combustion engine 2 means a portion that is composed of the cylinder 7 and the crankshaft 5 and that generates the driving force, and the internal combustion engine 2 is equivalent to the parallel twin cylinder internal combustion engine.

The cylinder 7 is provided with a cylinder block 8 formed with the first cylinder #1 and the second cylinder #2, a cylinder head 9 having a combustion chamber and provided on an upper portion of the cylinder block 8, and a head cover 10 provided on an upper portion of the cylinder head 9. As shown in FIG. 2, a rear wall of the cylinder head 9 is formed with two intake ports 11 for supplying fuel into the combustion chamber. On the other hand, a front wall of the cylinder head 9 is formed with an unillustrated exhaust port for exhausting exhaust gas from the combustion chamber.

A left crankcase cover 12 is bolted to a left portion of the crankcase 4, and also a right crankcase cover 13 is bolted to a right portion of the crankcase 4. The left crankcase cover 12 mainly covers substantially the entire area of a front area or a center area of the left portion of the crankcase 4, a substantially cylindrical generator storage portion 14 swelling outward in the engine width direction along the crank axis C1 is formed in a substantially center area in a side view of the left crankcase cover, and a generator 15 is stored in the generator storage portion 14.

Also, the right crankcase cover 13 covers substantially the entire area of the right portion of the crankcase 4, a substantially cylindrical clutch storage portion 16 swelling outward in the engine width direction is formed in an area positioned behind the crankshaft 5, and a clutch 17 is stored in the clutch storage portion 16.

Figure 3:
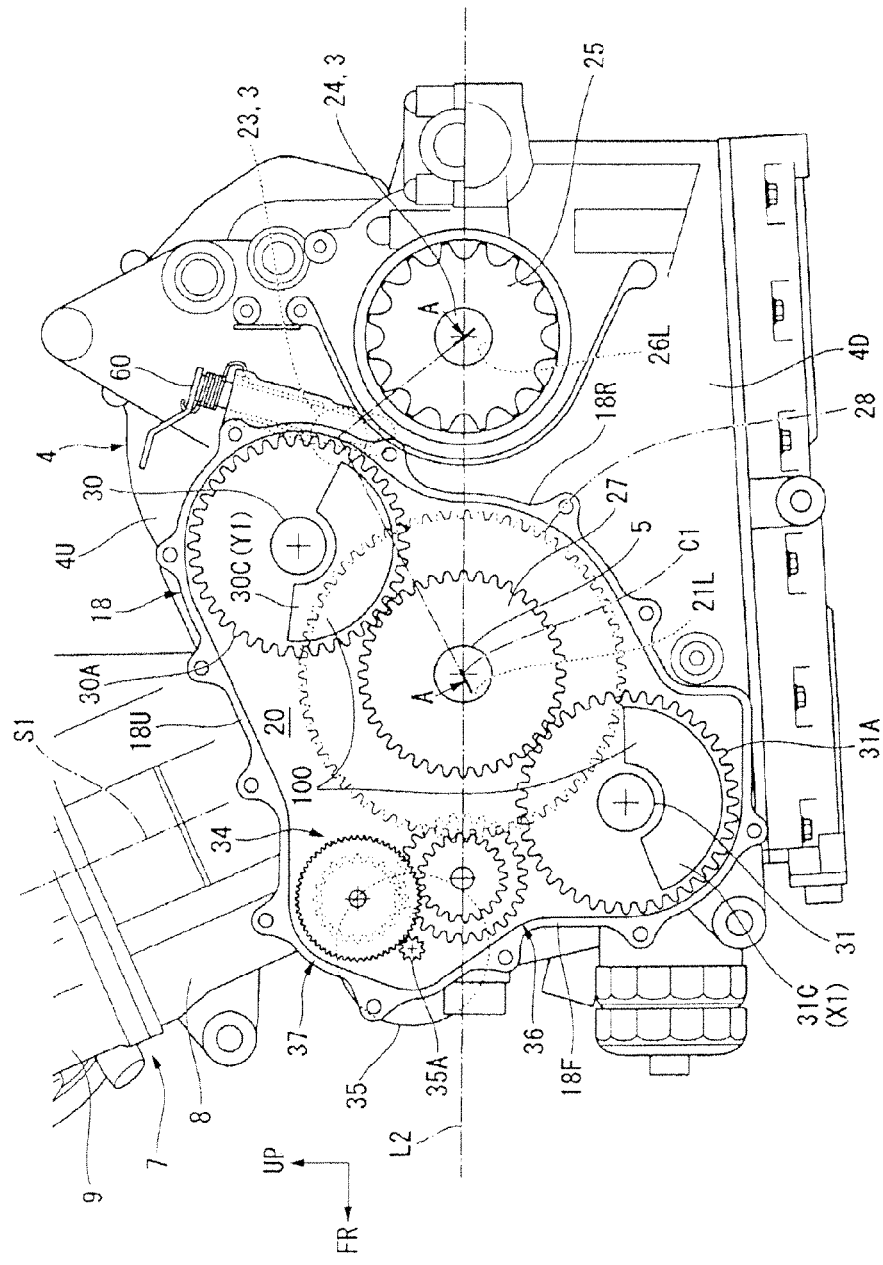
FIG. 3 is the left side view of the vehicle engine according to the first embodiment, with a left crankcase cover removed.

FIG. 3 shows the left portion of the crankcase 4 with the left crankcase cover 12 removed, the left portion of the crankcase 4 is formed with a peripheral wall portion 18 projecting outward in the engine width direction in order to extensively surround the front area or the center area of the left portion of the crankcase 4, and a storage space 20 opened outward in the engine width direction is formed inside of the peripheral wall portion 18. Here, the crankshaft 5 projects from the left portion of the crankcase 4, a plurality of toothed wheels or gears which will be described below are provided at a left end of the crankshaft 5. The gears provided to the crankshaft 5 and a plurality of gears meshed with the gears are supported by the crankcase 4 while being exposed to the outside from the left portion of the crankcase 4. The plurality of gears are arranged in the storage space 20 and are covered with the peripheral wall portion 18 from front, rear, upper and lower sides. The left crankcase cover 12 is fastened to the peripheral wall portion 18 while allowing an edge portion of the left crankcase cover to abut on the peripheral wall portion, and covers the plurality of gears from the left side.

In the embodiment, in the side view, an upper edge portion of the left portion of the crankcase 4 extends upward to the rear. Here, a schematic shape of the peripheral wall portion 18 will be described. An upper edge portion 18U of the peripheral wall portion 18 is formed to project outward in the engine width direction from the upper edge portion along the upper edge portion of the left portion of the crankcase 4, extends upward to the rear across the cylinder 7, and leads to the rear side beyond the crankshaft 5.

Also, a front edge portion 18F of the peripheral wall portion 18, extending downward from a front end of the upper edge portion 18U, leads to a lower end of the left portion of the crankcase 4, and a rear edge portion 18R extending from a lower end of the front edge portion 18F extends upward to the rear across the crankshaft 5 below the crankshaft 5 and is connected to the upper edge portion 18U of the peripheral wall portion 18. Also, the crankcase 4 has a vertically divided structure divided by a parting line L2, and has an upper half body 4U and a lower half body 4D. The peripheral wall portion 18 is formed to extend over the upper half body 4U and the lower half body 4D.

Also, in this embodiment, a divided surface of the crankcase 4 extending along the parting line L2 of the crankcase 4 is formed with a left crankshaft bearing portion 21L for rotatably supporting a journal portion set on a side of the left end of the crankshaft 5. The left crankshaft bearing portion 21L is configured in such a manner that a circular journal bearing portion is formed of an arcuate recessed portion formed in the upper half body 4U and an arcuate recessed portion formed in the lower half body 4D.

Figure 5:
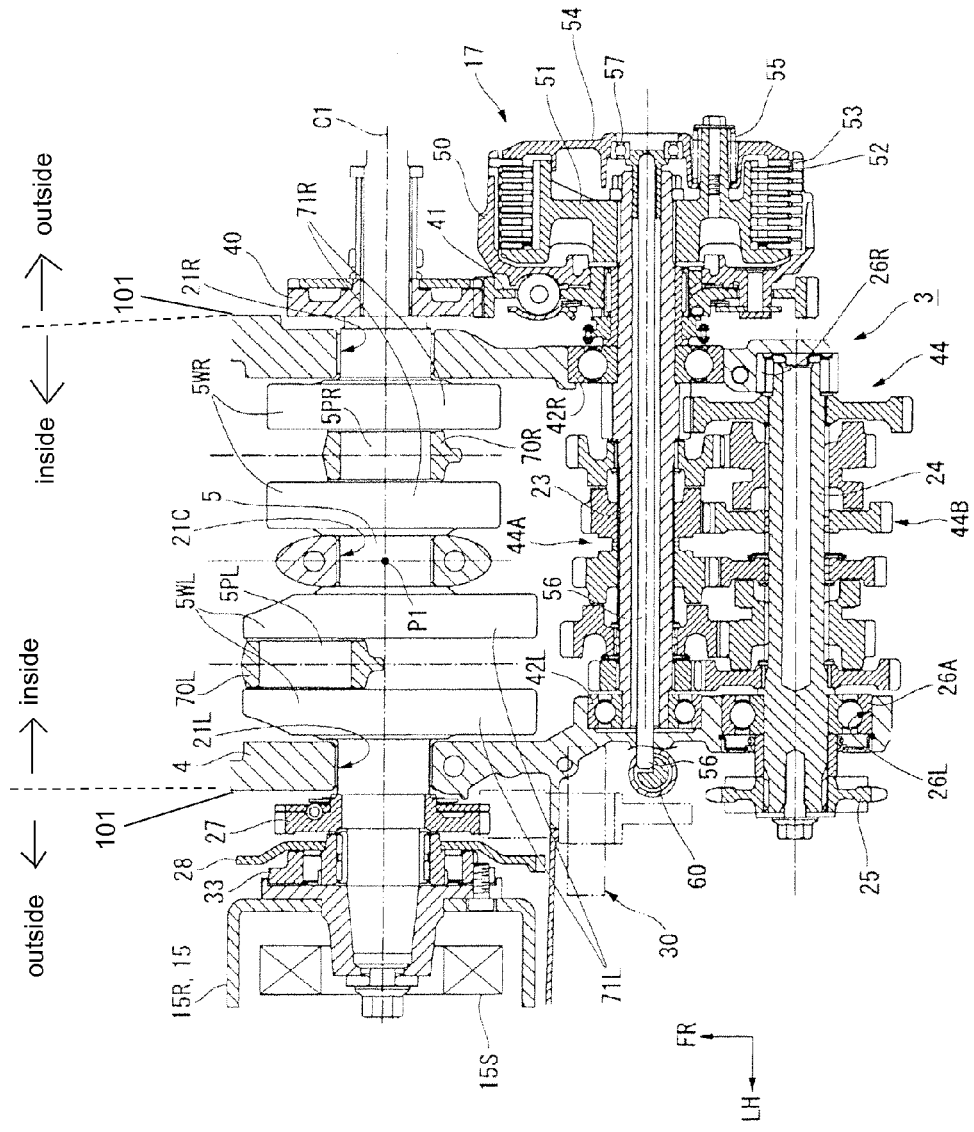
FIG. 5 is a developed cross-sectional view taken along line A-A in FIG. 3.

With reference to FIG. 5, as described above, the crankshaft 5 is configured such that the journal portion on the side of the left end of the crankshaft is supported by the left crankshaft bearing portion 21L, a journal portion at the center of the crankshaft is rotatably supported by a center crankshaft bearing portion 21C formed inside of the crankcase 4, and a journal portion set on a side of a right end of the crankshaft is rotatably supported by a right crankshaft bearing portion 21R formed in a right portion of the crankcase 4. In the same way as the left crankshaft bearing portion 21L, the center crankshaft bearing portion 21C and the right crankshaft bearing portion 21R are configured such that a circular journal bearing portion is formed of an arcuate recessed portion formed in the upper half body 4U and an arcuate recessed portion formed in the lower half body 4D. With reference to FIG. 5, the crankcase 4 also includes a side surface 101.

In FIG. 3 and FIG. 5, a main shaft 23 and a countershaft 24 are shown. The main shaft 23 is arranged to extend in the engine width direction along the crankshaft 5, and is transmitted with the driving force from the crankshaft 5. The countershaft 24 is arranged to extend in the engine width direction along the crankshaft 5, is transmitted with the driving force from the main shaft 23, and outputs the driving force after shift transmission (after deceleration) to the outside. Note that the transmission 3 is configured to include the main shaft 23 and the countershaft 24.

In FIG. 3, since the main shaft 23 is rotatably supported inside of the crankcase 4, the main shaft is shown by a broken line; however, in the side view, the main shaft 23 is arranged behind and above the crankshaft 5. Also, in the side view, the countershaft 24 is arranged behind the crankshaft 5, and behind and below the main shaft 23. A left end of the countershaft 24 projects from the left portion of the crankcase 4 and is exposed to the outside of the crankcase 4, and the left end thereof is provided with a drive sprocket 25.

In this embodiment, the divided surface of the crankcase 4 is formed with a left countershaft bearing portion 26L for rotatably supporting a journal portion set on a side of the left end of the countershaft 24. The left countershaft bearing portion 26L is configured such that a circular hole is formed of an arcuate recessed portion formed in the left portion of the upper half body 4U and an arcuate recessed portion formed in the lower half body 4D.

With reference to FIG. 5, a bearing 26A is fitted into the left countershaft bearing portion 26L and the countershaft 24 is inserted into the bearing 26A, thereby rotatably supporting the journal portion on the side of the left end of the countershaft 24. Also, as shown in FIG. 5, a right end of the countershaft 24 is rotatably supported through a roller bearing by a right countershaft bearing portion 26R formed on an inner side of the right portion of the crankcase 4, and also the right countershaft bearing portion 26R is configured such that a circular hole is formed of an arcuate recessed portion formed in the right portion of the upper half body 4U and an arcuate recessed portion formed in the lower half body 4D.

With reference to FIG. 5, the crankshaft 5 will be detailedly described. A pair of left crank webs 5WL which extend parallel to each other and which are formed of plate bodies is integrally formed in a portion positioned between the left crankshaft bearing portion 21L and the center crankshaft bearing portion 21C in the crankshaft 5, and a pair of right crank webs 5WR which extend parallel to each other and which are formed of plate bodies is integrally formed in a portion positioned between the center crankshaft bearing portion 21 and the right crankshaft bearing portion 21R in the crankshaft 5. A left crankpin 5PL is integrally formed at ends of the left crank webs 5WL, a right crankpin 5PR is integrally formed at ends of the right crank webs 5WR, the above-described left connecting rod 70L is connected to the left crankpin 5PL, and the right connecting rod 70R is connected to the right crankpin 5PR.

In this embodiment, the left crankpin 5PL and the right crankpin 5PR are arranged on the crankshaft 5 at a phase angle of 90 degrees around the crankshaft 5, and more specifically, the right crankpin 5PR is configured to be positioned on an advance side of the crankshaft 5 by 90 degrees in comparison with the left crankpin 5PL. In this case, for example, when the piston 72L connected to the left crankpin 5PL is at the top dead center, the piston 72R connected to the right crankpin 5PR is in a relation to be in a suction stroke or an expansion stroke.

The left crank webs 5WL are integrally formed with left counterweights 71L, and the right crank webs 5WR are integrally formed with right counterweights 71R. The left counterweights 71L are formed to project to a side opposite to a side with the left crankpin 5PL formed, when viewed in the axial direction of the crankshaft 5, and the right counterweights 71R are formed to project to a side opposite to a side with the right crankpin 5PR formed, when viewed in the axial direction of the crankshaft 5.

That is, the left counterweights 71L are arranged in a phase of 180 degrees with respect to the left crankpin 5PL around the crankshaft 5, and the right counterweights 71R are arranged in a phase of 180 degrees with respect to the right crankpin 5PR around the crankshaft 5.

In addition, in other words, the left counterweights 71L are provided such that positions of the centers of gravity of the left counterweights are positioned at positions being symmetrical at 180 degrees with respect to the left crankpin 5PL around the crankshaft 5, and the right counterweights 71R are provided such that positions of the centers of gravity of the right counterweights are positioned at positions being symmetrical at 180 degrees with respect to the right crankpin 5PR around the crankshaft 5.

The left counterweights 71L and the right counterweights 71R are respectively formed into a semicircular shape when viewed in the axial direction of the crankshaft 5. A reference sign W1 represents mass of a reciprocation section including the piston or the like, a reference sign W2 represents mass of a rotational motion section including the crankpins or the like, and a reference sign W3 represent mass of the counterweights. When W3=W1×0.5+W2, it is publicly known that a balance rate of each of the counterweights is set to 50%. In this embodiment, the mass of each of the left counterweights 71L and the right counterweights 71R is set so that the balance rate of each of the counterweights is set to 50%.

The left end of the crankshaft 5 projects outward in the engine width direction from the left crankshaft bearing portion 21L, and the right end of the crankshaft 5 projects outward in the engine width direction from the right crankshaft bearing portion 21R. In addition, with reference to also FIG. 3, a balancer drive gear 27, a starter gear 28, and a rotor 15R composing the generator 15, are provided, in order from the inner side in the engine width direction toward the outer side, at the left end of the crankshaft 5. Note that in FIG. 3, for the sake of convenience, the starter gear 28 is shown by a two-dot chain line, and the rotor 15R is omitted from the drawing.

Also, as shown in FIG. 3, in the side view, a left upper balancer shaft 30 is arranged behind and above the balancer drive gear 27, and a lower balancer shaft 31 is arranged in front of and below the balancer drive gear. The balancer drive gear 27 is meshed with a gear portion 30A formed at the left end of the left upper balancer shaft 30 and a gear portion 31A formed at the left end of the lower balancer shaft 31, thereby driving the left upper balancer shaft 30 and the lower balancer shaft 31.

Figure 6:
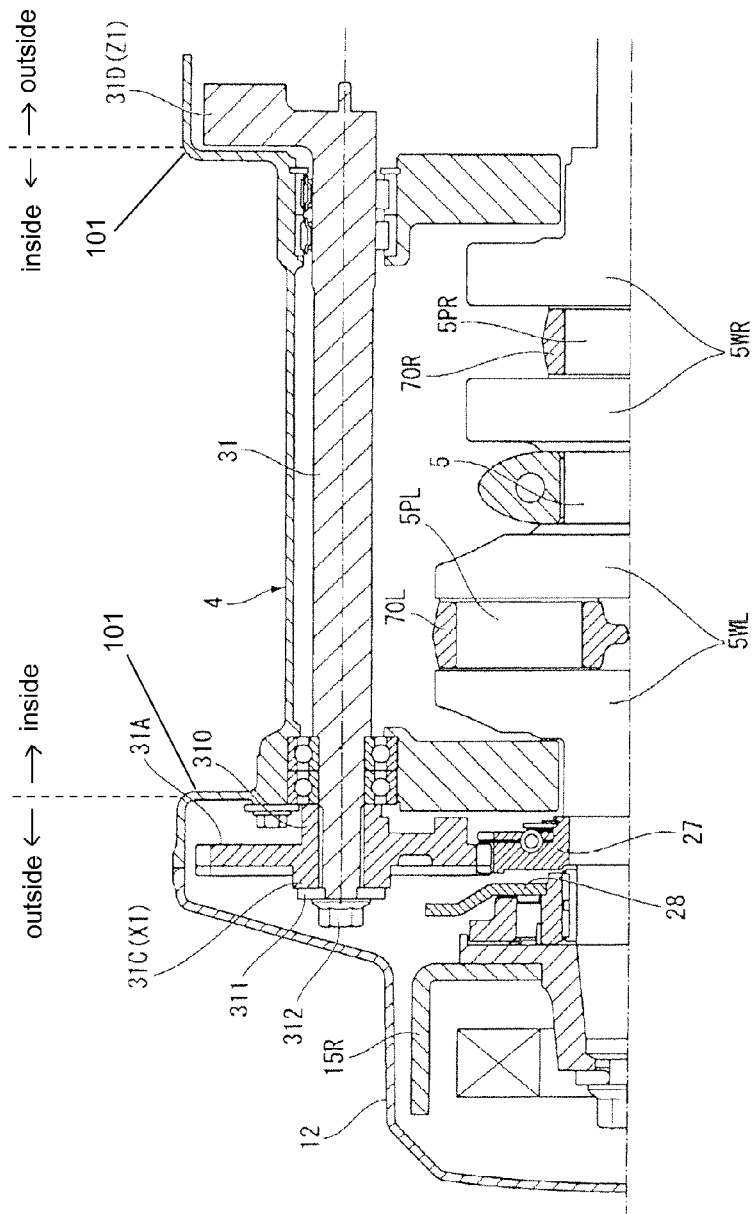
FIG. 6 is a cross-sectional view taken along line C-C in FIG. 1

The left end of the left upper balancer shaft 30 is formed with a left upper balancer 30C integrated with the gear portion 30A, and the left end of the lower balancer shaft 31 is formed with a left lower balancer 31C integrated with the gear portion 31A. Also, with reference to FIG. 2, in the embodiment, a right lower balancer 31D is arranged oppositely to the left lower balancer 31C of the lower balancer shaft 31 across the center in the vehicle width direction. As shown in FIG. 6, the right lower balancer 31D is provided at the right end of the lower balancer shaft 31. That is, the left lower balancer 31C and the right lower balancer 31D are arranged coaxially with each other.

As shown in FIG. 6, in this embodiment, the right lower balancer 31D is integrally formed at the right end of the lower balancer shaft 31, and the left lower balancer 31C is separately fixed to the left end of the lower balancer shaft 31 in such a manner that a boss portion 310 formed in the center of the gear portion 31A is spline-fitted around the left end of the lower balancer shaft 31. More detailedly, the left end of the lower balancer shaft 31 is inserted into the boss portion 310 and is exposed to the outside of the boss portion 310, and a washer 311 is inserted into an exposed portion so that the washer abuts on an end surface of the boss portion 310 from the outside in the axial direction thereof.

Further, a nut 312 is threadably mounted on the exposed portion at the left end of the lower balancer shaft 31, and the washer 311 is prevented from coming off by the nut 312. Thereby, the gear portion 31A and the left lower balancer 31C integrated with the gear portion are prevented from coming off from the lower balancer shaft 31.

Figure 4:
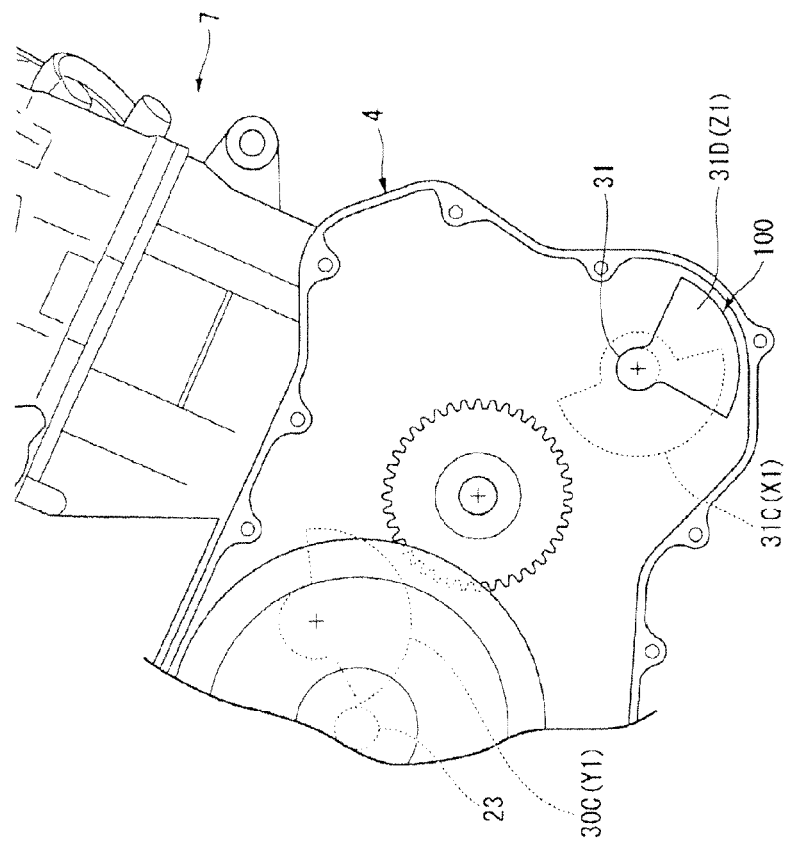
FIG. 4 is a right side view of the vehicle engine according to the first embodiment, with a right crankcase cover removed.

As shown in FIG. 3, the left lower balancer 31C is formed into the semicircular shape (fanlike shape) extending along a peripheral direction of the lower balancer shaft 31, and is formed integrally with an axially outer side surface of the gear portion 31A. Also, in the same manner, the left upper balancer 30C is formed into a semicircular shape (fanlike shape) extending along a peripheral direction of the left upper balancer shaft 30, and is formed integrally with an axially outer side surface of the gear portion 30A. On the other hand, FIG. 4 is a right side view of the vehicle engine 1 with the right crankcase cover 13 removed from the crankcase 4. As shown in the drawing, the right lower balancer 31D is formed into a fanlike shape projecting from the right end of the lower balancer shaft 31. Note that in FIG. 4, for the sake of convenience of explanation, the left upper balancer 30C and the left lower balancer 31C are shown by the broken line.

In this embodiment, as shown in FIG. 3, the left upper balancer 30C and the left lower balancer 31C are arranged leftwardly outward of the left side of the crankcase 4, and are covered with the left crankcase cover 12. Also, as shown in FIG. 4, the right lower balancer 31D is arranged rightwardly outward of the right side of the crankcase 4, and is covered with the right crankcase cover 13.

Figure 7:
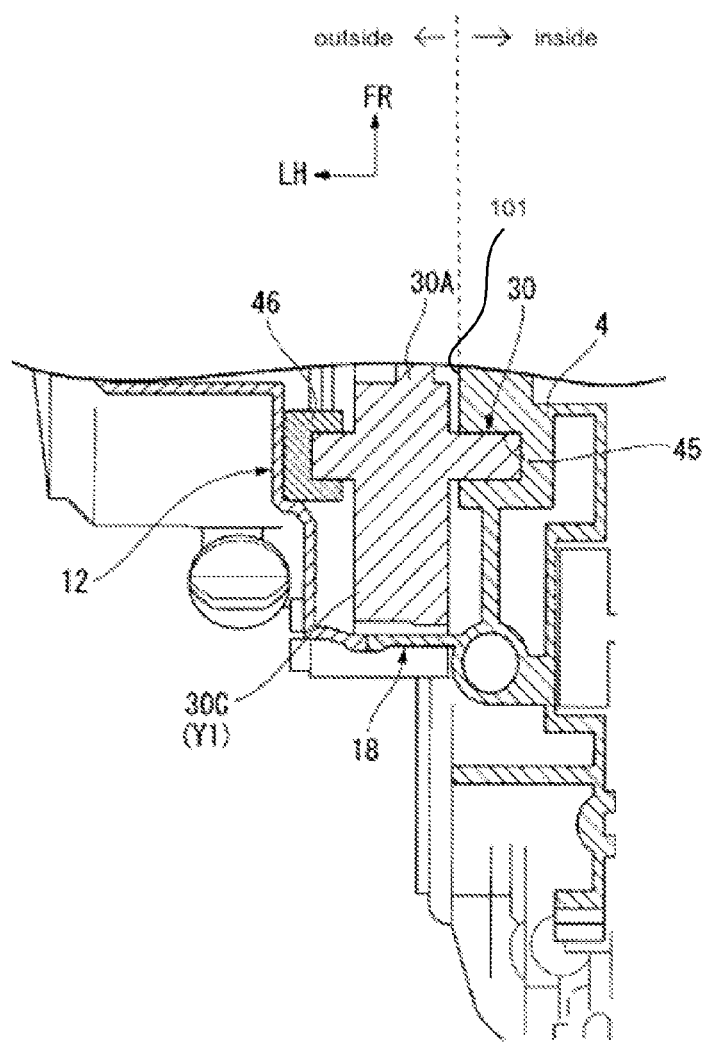
FIG. 7 is a cross-sectional view taken along line B-B in FIG. 1.

FIG. 7 is a cross-sectional view taken along line B-B in FIG. 1. In the embodiment, the light end of the left upper balancer shaft 30 is rotatably supported by a right balancer shaft bearing portion 45 formed in the left portion of the crankcase 4, and the left end thereof is rotatably supported by a left balancer shaft bearing portion 46 formed in the left crankcase cover 12. In this case, with the peripheral wall portion 18 in the left portion of the crankcase 4 covered with the left crankcase cover 12, the left upper balancer shaft 30 is stored between the crankcase 4 and the left crankcase cover 12. The left upper balancer shaft 30 is configured not to project into an internal space of the crankcase 4.

Also, with reference to FIG. 3, in this embodiment, the left upper balancer shaft 30 is supported by the upper half body 4U of the crankcase 4. On the other hand, the lower balancer shaft 31 is supported by the lower half body 4D of the crankcase 4.

In the following explanation, the left upper balancer 30C is referred to as "a first inertial force balancer Y1", the left lower balancer 31C driven by the lower balancer shaft 31 is referred to as "a first couple balancer X1", the right lower balancer 31D driven by the lower balancer shaft 31 is referred to as "a combined balancer Z1", and a device composed of these balancers is referred to as "a balancer device 100".

In this embodiment, the first inertial force balancer Y1, the first couple balancer X1 and the combined balancer Z1 are driven by the balancer drive gear 27, thereby suppressing vibration (primary vibration) generated when driving the vehicle engine 1. For details, it will be described below.

As shown in FIG. 3, in front of the left end of the crankshaft 5, that is, in front of the starter gear 28, an idle gear group 34 for transmitting the driving force of the starter motor 35 to the crankshaft 5 is arranged. The idle gear group 34 transmits the driving force to the starter gear 28. As shown in FIG. 5, the starter gear 28 is provided to the crankshaft 5 through a one-way clutch 33 fixed to the left end of the crankshaft 5, and transmits the driving force through the idle gear group 34 to the crankshaft 5 from a drive shaft 35A (see FIG. 3) of the starter motor 35 provided to a front portion of the crankcase 4. In this embodiment, the idle gear group 34 is composed of a first idle gear 36 arranged in front of the crankshaft 5, and a second idle gear 37 arranged above the first idle gear 36.

Returning to FIG. 5, the rotor 15R is formed into a cylindrical shape extending along the crankshaft 5 and is configured to cover, from the outside in the radial direction of the crankshaft 5, a stator 15S composing the generator 15 fixed on the inner side of the generator storage portion 14 of the left crankcase cover 12. The generator 15 composed of the rotor 15R and the stator 15S is positioned inside of the generator storage portion 14.

On the other hand, a drive sprocket 40 is provided at the right end of the crankshaft 5. The drive sprocket 40 is meshed with a driven sprocket 41 provided relatively rotatably at the right end of the main shaft 23. The main shaft 23 is rotatably supported by a left bearing 42L provided inside of the left portion of the upper half body 4U of the crankcase 4, and a right bearing 42R provided to the right portion of the upper half body 4U of the crankcase 4. The right end of the main shaft 23 projects outward in the engine width direction from the right bearing 42R, and the driven sprocket 41 is supported by the right end of the main shaft 23 in the crankcase 4.

The clutch 17 is provided outward in the engine width direction in comparison with the driven sprocket 41 at the right end of the main shaft 23, and the driven sprocket 41 transmits the driving force of the crankshaft 5 to the main shaft 23 through the clutch 17. A transmission gear group 44 is arranged to extend over the main shaft 23 and the countershaft 24, and the transmission 3 is mainly composed of the main shaft 23, the countershaft 24 and the transmission gear group 44. More specifically, the main shaft 23 is provided with a drive gear 44A for a sixth-speed, and the countershaft 24 is provided with a driven gear 44B for a six-speed. The drive gear 44A and the driven gear 44B are meshed with each other at the corresponding shift positions, and compose a pair of shift gears corresponding to the respective shift positions. The shift positions are switched over by an unillustrated shifter.

The clutch 17 is provided with a cylindrical outer housing 50 that is connected to the driven sprocket 41 and that projects outward in the engine width direction. An inner housing 51 is provided inside of the outer housing 50 and is connected to the main shaft 23. A friction disc 52 and a clutch disc 53 are alternately provided in a laminated manner between the outer housing 50 and the inner housing 51. A pressure plate 54 is arranged to sandwich the friction disc 52 and the clutch disc 53 between the inner housing 51 and the pressure plate. A spring 55 elastically biases the pressure plate 54 to a side of the inner housing 51 and frictionally engages the friction disc 52 with the clutch disc 53.

The clutch 17 is disengaged when the pressure plate 54 is detached from the side of the inner housing 51 against biasing force of the spring 55, and is engaged by the spring 55 when the force is canceled.

The main shaft 23 is formed into a hollow shape, a push rod 56 is inserted into the main shaft 23, and the clutch 17 is switched to be disengaged/engaged according to forward and backward movement of the push rod 56.

The push rod 56 is arranged to project outward in the engine width direction from the left end of the main shaft 23 and to project outward in the engine width direction from the right end of the main shaft 23, and the right end of the push rod 56 abuts on the pressure plate 54 through a bearing 57 from the inner side in the engine width direction. The push rod 56 is moved rightward in such a manner that the left end thereof is pushed to the right side by a clutch actuating portion 60 arranged on the left side of the crankcase 4, thereby push-pressing the pressure plate 54 and detaching the pressure plate from the inner housing 51. As a result, the clutch 17 is disengaged. The clutch actuating portion 60 is rotated, so that the push rod 56 is moved forward and backward.

Setting of the mass, layout, and the like of the three balancers, that is, the first inertial force balancer Y1, the first couple balancer X1 and the combined balancer Z1 in the balancer device 100 according to this embodiment will be described below.

First, FIG. 8(A) is a pattern diagram of the left crankpin 5PL, the right crankpin 5PR, the left connecting rod 70L, the right connecting rod 70R, the piston 72L equivalent to the first piston connected to the left connecting rod 70L, and the piston 72R equivalent to the second piston connected to the right connecting rod 70R. A reference sign R1 in the drawing represents a rotational direction of the crankshaft 5.

In this embodiment, the left crankpin 5PL and the right crankpin 5PR are arranged on the crankshaft 5 at the phase angle of 90 degrees around the crankshaft 5, and the right crankpin 5PR is configured to be positioned on the advance side of the crankshaft 5 by 90 degrees in comparison with the left crankpin 5PL.

Therefore, when viewed in the axial direction of the crankshaft 5, as is clear from the position of each crankpin shown in FIG. 8(B), for example, at the position where the piston 72L connected to the left crankpin 5PL is at the top dead center, the piston 72R connected to the right crankpin 5PR is advanced by 90 degrees to the advance side of the crankshaft 5. Note that θ in the drawing is 90 degrees.

In this embodiment, a reference sign $2m$ represents the mass of the reciprocation section, and a reference sign r represents a crank radius. The mass of each of the left counterweights 71L provided to the left crank webs 5WL and the right counterweights 71R provided to the right crank webs 5WR is set so that the balance rate as the counterweigh is set to 50%.

In this case, as shown in FIG. 8(C), in the vehicle engine 1, the first cylinder vibratory force F1 and the second cylinder vibratory force F2 are generated. The first cylinder vibratory force F1 generates force directed outward in the radial direction of the crankshaft 5 at each point around a rotational direction R2 while performing inverse rotation (rotation in the R2 direction) with the same period as the crankshaft 5 based on the position where the piston 72L stored in the first cylinder #1 is at the top dead center. The second cylinder vibratory force F2 generates force directed outward in the radial direction of the crankshaft 5 at each point around the rotational direction R2 while performing the inverse rotation (rotation in the R2 direction) with the same period as the crankshaft 5 based on the position where the piston 72R stored in the second cylinder #2 is at the top dead center.

When ω represents the crank rotation angular speed of the crankshaft 5, the magnitude of each of the first cylinder vibratory force F1 and the second cylinder vibratory force F2 is set as below.

$$F1=mr\omega^2$$

$$F2=mr\omega^2$$

That is, there is a 50% possibility that the left counterweight 71L and the right counterweight 71R reduce the inertial force of each of the corresponding reciprocation sections, and the remaining 50% is generated as the vibratory force.

In FIG. 8(C), a reference sign "DL" represents "an angle bisector" as a straight line for bisecting an angle formed between the first cylinder vibratory force F1 and the second cylinder vibratory force F2, when viewed in the axial direction of the crankshaft 5. In the embodiment, on the premise of the layout and setting of each balancer, the first cylinder vibratory force F1 and the second cylinder vibratory force F2 are resolved into the inertial force component and the couple component based on the angle bisector DL.

Figure 9:
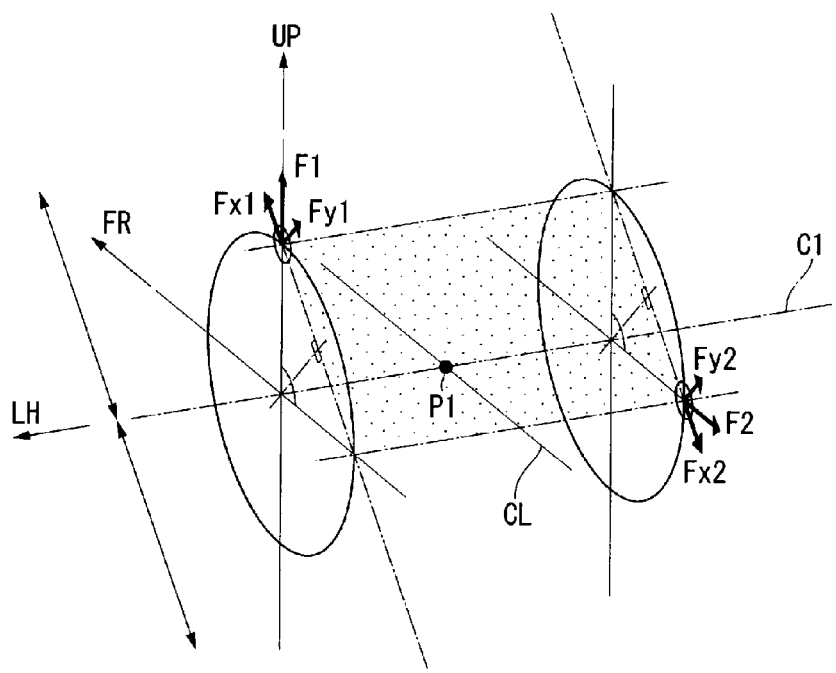
FIG. 9 is a conceptual diagram illustrating a layout and a phase of each balancer for the balancer device according to the first embodiment, (A) is a view illustrating a state of the vibratory force, and (B) is a conceptual diagram illustrating force facing the vibratory force being the basis of the setting of each balancer.
Figure 9:
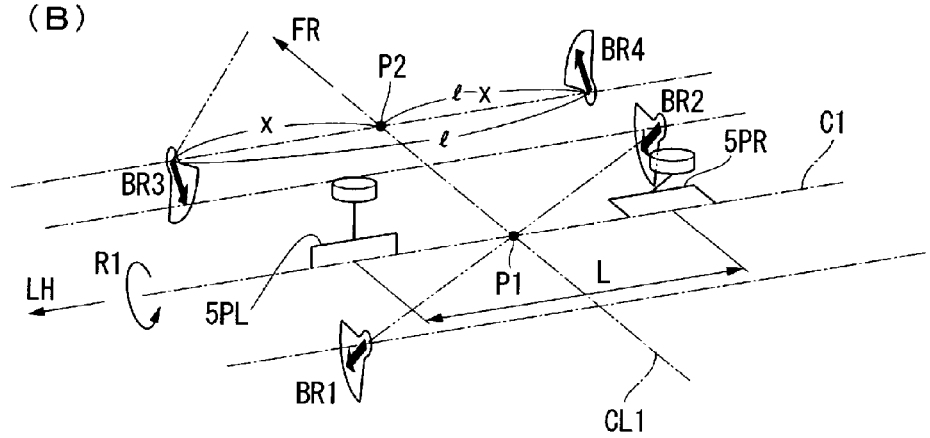

That is, as shown in FIG. 8(C) and FIG. 9(A), the first cylinder vibratory force F1 is resolved into a first inertial force component Fy1 resolved into the direction parallel to the angle bisector DL and a first couple component Fx1 resolved into the direction parallel to the plane perpendicular to the angle bisector DL. Also, the second cylinder vibratory force F2 is resolved into a second inertial force component Fy2 resolved in the direction parallel to the angle bisector DL and a second couple component Fx2 resolved into the direction parallel to the plane perpendicular to the angle bisector DL.

The magnitude of each of the first inertial force component Fy1, the first couple component Fx1, the second inertial force component Fy2, and the second couple component Fx2 is set as below.

$$Fy1=mr\omega^2 \cos(\theta/2)$$

$$Fx1=mr\omega^2 \sin(\theta/2)$$

$$Fy2=mr\omega^2 \cos(\theta/2)$$

$$Fx2=mr\omega^2 \sin(\theta/2)$$

In this embodiment, the mass and layout (angle) of each balancer are set to generate force facing the first inertial force component Fy1, the first couple component Fx1, the second inertial force component Fy2, and the second couple component Fx2.

With reference to FIG. 9(B), when the mass and layout (angle) of each balancer are set, first, force facing the first inertial force component Fy1 and force facing the second inertial force component Fy2, that is, BR1 and BR2 as force facing the first inertial force component Fy1 and force facing the second inertial force component Fy2 and canceling (reducing) the components are determined. As for conditions of the BR1 and the BR2 for properly reducing the first inertial force component Fy1 and the second inertial force component Fy2, there are following three conditions (called conditions for cancellation of inertial force).

(1) The magnitude of the force of the BR1 is $mr\omega^2 \cos(\theta/2)$, and the BR1 generates the force facing the first inertial force component Fy1 at a position of $\pi+\theta/2$ in a balancer drive shaft rotational direction (the rotational direction opposite to the rotational direction of the crankshaft 5) from the angle bisector DL.

(2) The magnitude of the force of the BR2 is $mr\omega^2 \cos(\theta/2)$, and the BR2 generates the force facing the second inertial force component Fy2 at the position of $\pi+\theta/2$ in the balancer drive shaft rotational direction (the rotational direction opposite to the rotational direction of the crankshaft 5) from the angle bisector DL.

(3) While the BR1 and the BR2 satisfy the conditions as set above, the positions with the force of the BR1 and the force of the BR2 generated are positioned symmetrical to each other around the bisection point P1 (see also FIG. 5) positioned at the center of the crankshaft 5 on the plane that bisects the segment for connecting the center of the first cylinder #1 to the center of the second cylinder #2 and that is perpendicular to the segment in a planar view. Note that the magnitude of the force of the BR1 and the magnitude of the force of the BR2 are equal to each other.

"Positioned symmetrical to each other around the bisection point P1" means positions where the positions with the BR1 and the BR2 generated are symmetrical to each other across the bisection point P1 in the planar view, positions where the positions with the BR1 and the BR2 generated are symmetrical to each other across the bisection point P1 in the side view, and the case where the BR1 and the BR2 are directed in the same direction.

Next, BR3 facing the first couple component Fx1 and BR4 facing the second couple component Fx2 are respectively determined. As for conditions of the BR3 and the BR4 for properly reducing the first couple component Fx1 and the second couple component Fx2, there are following four conditions (conditions for cancellation of couple).

(1) The magnitude of the force of the BR3 is $\alpha\omega^2$ ($\alpha$ will be described below), and the BR3 generates the force facing the first couple component Fx1 at a position of $\pi/2+\theta/2$ in the balancer drive shaft rotational direction (the rotational direction opposite to the rotational direction of the crankshaft 5) from the angle bisector DL.

(2) The magnitude of the force of the BR4 is $\beta\omega^2$ ($\beta$ will be described below), and the BR4 generates the force facing the second couple component Fx2 at the position of $3\pi/2+\theta/2$ in the balancer drive shaft rotational direction (the rotational direction opposite to the rotational direction of the crankshaft 5) from the angle bisector DL.

(3) While the BR3 and the BR4 satisfy the conditions as set above, the positions with the force of the BR3 and the force of the BR4 generated are arranged coaxially with each other with respect to the shaft extending in the direction parallel to the crankshaft 5, and the directions of each force are symmetric through 180 degrees around the shaft. Note that a coaxial relation may be the case that the positions are arranged on the common shaft or the case that the positions are arranged on shafts separated from each other.

(4) In the common shaft for the BR3 and the BR4, a reference sign x represents a distance to a position with the BR3 generated from a point P2 with which a straight line intersects, the straight line being passed through the bisection point P1 and perpendicular to the crankshaft 5, a reference sign l represents a distance between the position with the BR3 generated and the position with the BR4 generated, and a reference sign L represents a length of the segment for connecting the center of the first cylinder #1 to the center of the second cylinder #2. In this case, the following relation is in effect between α and β.

$$\alpha = 2mr\sin(\theta/2) \times (L/x) - \beta(l/x-1)$$

$$\beta = 2mr\sin(\theta/2) \times (L/(l-x)) - \alpha(l/(l-x))$$

As described above, setting of the balancers in order to generate force for satisfying the conditions for the cancellation of the inertial force and the conditions for the cancellation of the couple makes it possible to generate the force facing the first cylinder vibratory force F1 and the force facing the second cylinder vibratory force F2 and to basically reduce the vibration caused by the force.

In the conditions for the cancellation of the inertial force, the magnitude and direction of the force of each of the BR1 and the BR2 cannot be changed; however, as long as the respective conditions (1) to (3) are satisfied, the distance therebetween is changed, and the positions thereof are optionally set. Hereinafter, admissibility of change is called "admissibility of conditions for cancellation of inertial force".

Also, in the conditions for the cancellation of the couple, as long as the respective conditions (1) to (4) are satisfied, the position of the common shaft for the BR3 and the BR4 is optionally set, and the axial positions of the BR3 and the BR4 are optionally changed. Hereinafter, admissibility of change is called "admissibility of conditions for cancellation of couple".

In this embodiment, by using the admissibility of the conditions for the cancellation of the inertial force and the admissibility of the conditions for the cancellation of the couple, BRF as force with the BR2 and the BR4 combined with each other is determined, and the combined balancer Z1 is properly set by the BRF based on the conditions for reducing the inertial force component and the couple component. On the other hand, the first inertial force balancer Y1 is set based on the BR1, and the first couple balancer X1 is set based on the BR3.

Figure 10:
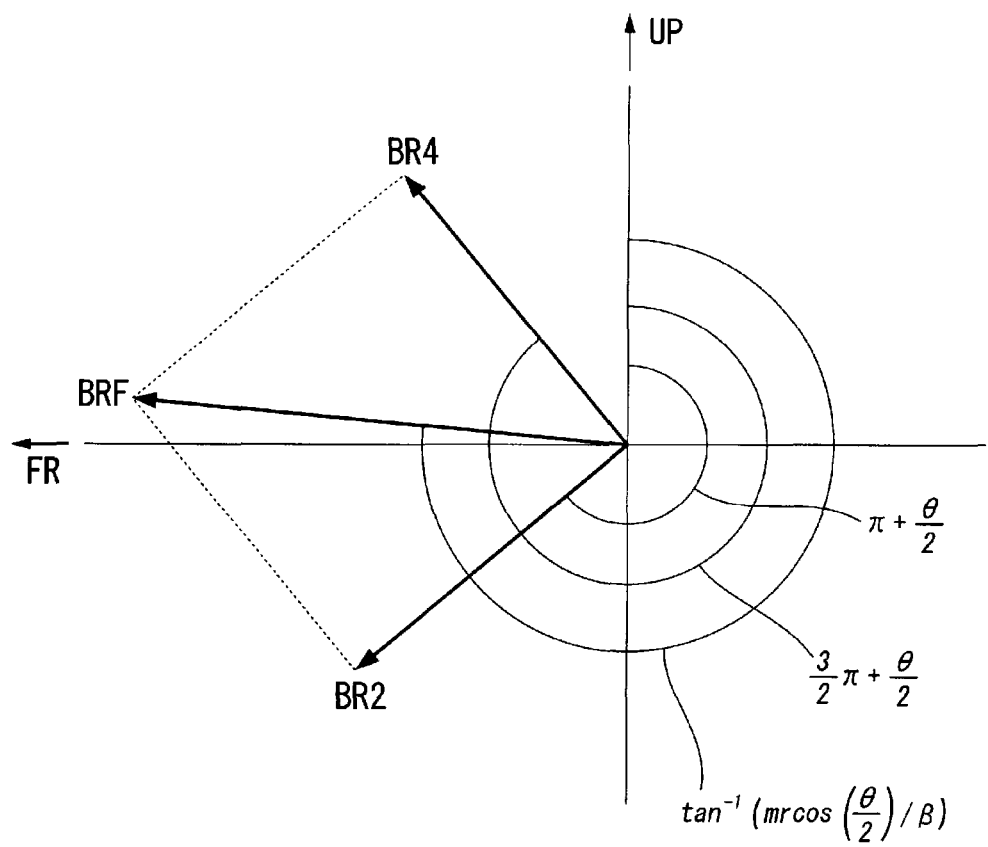
FIG. 10 is a conceptual diagram illustrating force facing vibratory force being the basis of a combined balancer for the balancer device according to the first embodiment.

Note that when the BR2 and the BR4 are combined with each other, it is based on the premise that the positions of the BR2 and the BR4 from the bisection point P1 in the axial direction of the crankshaft 5 are matched with each other. With reference to also FIG. 10, the BRF functions as force to satisfy the following combination condition.

The magnitude of force of the BRF is $\sqrt{(mr\omega^2\cos(\theta/2))^2 + (\beta\omega^2)^2}$, and the BRF generates force at a position of $\tan^{-1}((mr\cos(\theta/2)\beta)$ in the balancer drive shaft rotational direction (the rotational direction opposite to the rotational direction of the crankshaft 5) from the angle bisector DL.

The following inertial force compound conditions and couple compound conditions can be derived based on the combination condition, the conditions for the cancellation of the inertial force and the conditions for the cancellation of the couple.

Inertial Force Compound Conditions:

(1) The magnitude of the force of the BR1 is $mr\omega 2\cos(\theta/2)$, and the BR1 generates force facing the first inertial force compound Fy1 at a position of $\pi+\theta/2$ in the balancer drive shaft rotational direction (the rotational direction opposite to the rotational direction of the crankshaft 5) from the angle bisector DL.

(2) While the BR1 satisfies the above-mentioned condition (1) and also the BRF satisfies the combination condition, the positions with the force of the BR1 and the force of the BRF generated are positioned symmetrical to each other around the bisection point P1 positioned at the center of the crankshaft 5 on the plane that bisects the segment for connecting the center of the first cylinder #1 to the center of the second cylinder #2 and that is perpendicular to the segment, in the planar view.

Couple Compound Conditions:

(1) The magnitude of the force of the BR3 is $\alpha\omega^2$, and the BR3 generates force facing the first couple compound Fx1 at a position of $\pi/2+\theta/2$ in the balancer drive shaft rotational direction (the rotational direction opposite to the rotational direction of the crankshaft 5) from the angle bisector DL.

(2) While the BR3 satisfies the above-mentioned condition (1), and the BRF satisfies the above-mentioned combination condition, the positions with the force of the BR3 and the force of the BRF generated are arranged coaxially with each other with respect to the shaft extending in the direction parallel to the crankshaft 5. Note that the coaxial relation may be the case that the positions are arranged on the common shaft or the case that the positions are arranged on shafts separated from each other.

(3) In the common shaft for the BR3 and the BRF, the reference sign x represents the distance to the position with the BR3 generated from the point P2 with which the straight line intersects, the straight line being passed through the bisection point P1 and perpendicular to the crankshaft 5, the reference sign l represents the distance between the position with the BR3 generated and the position with the BRF generated, and the reference sign L represents the length of the segment for connecting the center of the first cylinder #1 to the center of the second cylinder #2. In this case, the following relation is effect between α and β.

$$\alpha = 2mr\sin(\theta/2) \times (L/x) - \beta(l/x-1)$$

$$\beta = 2mr\sin(\theta/2) \times (L/(l-x)) - \alpha(l/(l-x))$$

In this embodiment, in order to satisfy the inertial force compound conditions and the couple compound conditions, the first inertial force balancer Y1, the first couple balancer X1, and the combined balancer Z1 are set.

Specifically, the first inertial force balancer Y1 is configured such that the force of the BR1 is generated, the amount of unbalance with respect to the reciprocation section including the piston 72L is set to $mr\cos(\theta/2)$, and the force facing the first inertial force compound Fy1 is generated at the position of $\pi+\theta/2$ in the balancer drive shaft rotational direction (the rotational direction opposite to the rotational direction of the crankshaft 5) from the angle bisector DL.

That is, specifically, the first inertial force balancer Y1 (left upper balancer 30C) is set such that, for example, in a mass m $\cos(\theta/2)$, the distance from the center of the balancer shaft to the center of gravity thereof is set to a reference sign r or the like, and when the piston 72L is at the top dead center, the center of gravity thereof is directed to the position of $\pi+\theta/2$ in the rotational direction (the rotational direction opposite to the rotational direction of the crankshaft 5) of the left upper balancer shaft 30 from the angle bisector DL so as to perform the inverse rotation with the same period as the crankshaft 5.

Also, the first couple balancer X1 is configured such that the force of the BR3 is generated, the amount of unbalance with respect to the reciprocation section including the piston 72L is set to α, and the force facing the first couple compound Fx1 is generated at the position of $\pi/2+\theta/2$ in the balancer drive shaft rotational direction (the rotational direction opposite to the rotational direction of the crankshaft 5) from the angle bisector DL.

That is, specifically, the first couple balancer X1 (left lower balancer 31C) is set such that, for example, in a mass α/r, the distance from the center of the balancer shaft to the center of gravity thereof is set to a reference sign r or the like, and when the piston 72L is at the top dead center, the center of gravity thereof is directed to the position of π/2+θ/2 in the rotational direction (the rotational direction opposite to the rotational direction of the crankshaft 5) of the lower balancer shaft 31 from the angle bisector DL so as to perform the inverse rotation with the same period as the crankshaft 5.

And, the combined balancer Z1 is configured such that the force of the BRR is generated, the amount of unbalance with respect to the reciprocation section including the piston 72L is set to $(\sqrt{(mr\omega^2 \cos(\theta/2))^2+(\beta\omega^2)^2})/\omega^2$, and the force is generated at the position of $\tan^{-1}((mr \cos(\theta/2)/\beta)$ in the balancer drive shaft rotational direction (the rotational direction opposite to the rotational direction of the crankshaft 5) from the angle bisector DL.

That is, the combined balancer Z1 is set such that, the mass with the amount of unbalance set as above and the position of the center of gravity thereof are set, and the center of gravity thereof is directed to the position of $\tan^{-1}((mr\omega^2 \cos(\theta/2)/\beta)$ in the rotational direction (the rotational direction opposite to the rotational direction of the crankshaft 5) of the lower balancer shaft 31 from the angle bisector DL so as to perform the inverse rotation with the same period as the crankshaft 5.

Also, in the planar view, the first inertial force balancer Y1 and the combined balancer Z1 are arranged to be positioned symmetrical to each other around the bisection point P1.

Further, the first couple balancer X1 and the combined balancer Z1 are arranged coaxially with each other.

Furthermore, the reference sign x represents the distance from the point P2 (see FIG. 9) to the first couple balancer X1, the reference sign l represents the distance between the first couple balancer X1 and the combined balancer Z1, and the reference sign L represents the length of the segment for connecting the center of the first cylinder #1 to the center of the second cylinder #2. In this case, the following relation between α and β is set to be maintained.

$$\alpha = 2mr \sin(\theta/2) \times (L/x) - \beta(l/x - 1)$$

$$\beta = 2mr \sin(\theta/2) \times (L/(l-x)) - \alpha(l/(l-x))$$

In this way, in the vehicle engine 1 according to this embodiment, the conditions of the first inertial force balancer Y1, the first couple balancer X1, and the combined balancer Z1 are set, and the balancer device 100 including these balancers is composed.

Note that when the balancer satisfying the condition of the BR2 is configured as "the second inertial force balancer Y2" and the balancer satisfying the condition of the BR4 is configured as "the second couple balancer X2", the combined balancer Z1 is equivalent to the balancer with the second inertial force balancer Y2 and the second couple balancer X2 combined with each other. Constitution of the second inertial force balancer Y2 and the second couple balancer X2 will be described in a second embodiment.

Also, in this embodiment, θ is set to 90 degrees, and the above-described conditions for the cancellation of the inertial force, the conditions for the cancellation of the couple, the combination condition, the inertial force compound conditions, and the couple compound conditions are satisfied when (0 degree)<θ<(180 degrees). In the case of (180 degrees)<θ< (360 degrees), it will be described in the following paragraph.

As described above, the balancer device 100 according to the embodiment is the balancer device for the parallel twin cylinder internal combustion engine in which the left crankpin 5PL equivalent to the first crankpin and the right crankpin 5PR equivalent to the second crankpin are provided to the common crankshaft 5 at the predetermined phase angle θ (90 degrees in the embodiment) and the cylinder block 8 is formed with the first cylinder #1 corresponding to the left crankpin 5PL and the second cylinder #2 corresponding to the right crankpin 5PR. The balancer device for the parallel twin cylinder internal combustion engine is configured to reduce the first cylinder vibratory force F1 and second cylinder vibratory force F2 which are generated when the crankshaft 5 is rotated, the first cylinder vibratory force F generating force directed outward in the radial direction of the crankshaft 5 while performing inverse rotation with the same period as the crankshaft 5 based on the position where the piston 72L stored in the first cylinder #1 is at the top dead center, the second cylinder vibratory force F2 generating force directed outward in the radial direction of the crankshaft 5 while performing the inverse rotation with the same period as the crankshaft 5 based on the position where the piston 72R stored in the second cylinder #2 is at the top dead center.

In the balancer device 100, when viewed in the axial direction of the crankshaft 5, the straight line for bisecting the angle formed between the first cylinder vibratory force F1 and the second cylinder vibratory force F2 is defined as the angle bisector DL, the force with the first cylinder vibratory force F1 and the second cylinder vibratory force F2 resolved in the direction parallel to the angle bisector is defined as the inertial force component (the first inertial force component Fy1 and the second inertial force component Fy2), and the force with the first cylinder vibratory force F1 and the second cylinder vibratory force F2 resolved in the direction parallel to the plane perpendicular to the angle bisector DL is defined as the couple component (the first couple component Fx1 and the second couple component Fx2). The balancer device 100 includes the inertial force balancers (the first inertial force balancer Y1 and the combined balancer Z1) provided for generating the force facing the inertial force components, and the couple balancers (the first couple balancer X1 and the combined balancer Z1) provided for generating the force facing the couple components.

In the balancer device 100 having such a structure, the vibratory force of the primary vibration generated with the same period as the rotation of the crankshaft is resolved into two directions, that is, into the inertial force component and the couple component, and the inertial force balancer and the couple balancer are set to face the inertial force component and the couple component. Therefore, the primary vibration is reduced.

If the inertial force balancer satisfies the conditions to reduce the inertial force component while facing it and the couple balancer satisfies the conditions to reduce the couple component while facing it, the setting of mass and layout of the balancers are comparatively flexibly performed, and the degree of freedom in layout of the balancers is improved. Therefore, the degree of freedom in layout of the parallel twin cylinder internal combustion engine is improved.

Also, in the balancer device 100 according to this embodiment, the BR1 as the force facing the first inertial force component Fy1, the BR2 as the force facing the second inertial force component Fy2, the BR3 as the force facing the first couple component Fx1, and the BR4 as the force facing the second couple component Fx2 are determined, and the BRF obtained by combining the BR2 of the BR1 and the BR2 with the BR4 of the BR3 and the BR4 is determined. The combined balancer Z1 is composed based on the force of the BRF.

The first inertial force balancer Y1 is composed based on the BR1, and the first couple balancer X1 is composed based on the BR3. In the planar view, the first inertial force balancer Y1 and the combined balancer Z1 are arranged symmetrically with the bisection point P1 positioned around the crankshaft 5 as the center on the plane that bisects the segment for connecting the center of the first cylinder #1 to the center of the second cylinder #2 and that is perpendicular to the segment, and the first couple balancer X1 and the combined balancer Z1 are arranged coaxially with each other.

In such a structure, the primary vibration is reduced by the three balancers, the occupation of the internal space in the parallel twin cylinder internal combustion engine (the crankcase) by the left upper balancer shaft 30 is suppressed by shortening the left upper balancer shaft 30 as the drive shaft of the uncombined first inertial force balancer, and for example, the downsizing of the parallel twin cylinder internal combustion engine is performed by, for example, bringing the shaft members of the transmission, the starter or the like close to the crankshaft 5. As a result, the degree of freedom in layout of the parallel twin cylinder internal combustion engine is improved.

Also, the primary vibration is properly reduced by coaxially arranging the uncombined first couple balancer X1 and the combined balancer Z1 with each other, the number of components is suppressed by using the common shaft (lower balancer shaft 31) for the coaxially-arranged first couple balancer X1 and combined balancer Z1, and the drive force transmission media such as the gear and the chain with respect to the balancers on the common shaft is made common. As a result, the structure is simplified.

Also, as described above, the BR3 and the BR4 as force to cancel the couple components are increased or reduced according to the positions in the axial direction. For this reason, when the BR4 and the BR2 are combined with each other, the mass and the direction (phase) of the center of gravity of the combined balancer Z1 are changed by the magnitude (mass) according to the position of the BR4. Therefore, the position of the BR4 in the axial direction is determined, and accordingly, the phase of the combined balancer Z1 with respect to the first couple balancer X1 is set, so that the primary vibration is properly reduced.

In the balancer device 100 according to this embodiment, the combined balancer Z1 (the right lower balancer 31D), the first inertial force balancer Y1 (the left upper balancer 30C), and the first couple balancer X1 (the left lower balancer 31C) are arranged outside of the crankcase 4. For this reason, the occupation of the internal space in the parallel twin cylinder internal combustion engine (the crankcase 4) by the balancers is suppressed, and, for example, downsizing of the parallel twin cylinder internal combustion engine is achieved by, for example, bringing the shaft members of the transmission, the starter or the like close to the crankshaft 5. As a result, the degree of freedom in layout of the parallel twin cylinder internal combustion engine is improved.

In the balancer device 100 according to this embodiment, the left upper balancer shaft 30 for driving the first inertial force balancer Y1 is supported by the side surface of the crankcase 4 and the left crankcase cover 12. For this reason, the occupation of the internal space in the parallel twin cylinder internal combustion engine (the crankcase 4) by the first inertial force balancer Y1 and the left upper balancer shaft 30 is suppressed, and, the downsizing of the parallel twin cylinder internal combustion engine is achieved since, for example, the shaft members of the transmission, the starter or the like are reliably easily brought close to the crankshaft 5. As a result, the degree of freedom in layout of the parallel twin cylinder internal combustion engine is reliably improved.

Also, in the balancer device 100 according to this embodiment, the combined balancer Z1 is formed integrally with the lower balancer shaft 31 as the drive shaft of the combined balancer, and the first couple balancer X1 is separately fixed to the lower balancer shaft 31 by the fastening member. With this structure, since the occupation of the internal space in the parallel twin cylinder internal combustion engine (the crankcase 4) by the balancers is suppressed, and the first couple balancer X1 is separately formed, handleability and assemblability are improved.

Also, in the balancer device 100 according to this embodiment, the crankcase 4 has the vertically divided structure, the left upper balancer shaft 30 as the drive shaft of the first inertial force balancer Y1 is arranged in the upper half body 4U of the crankcase 4, and the lower balancer shaft 31 as the drive shaft of the combined balancer Z1 and the first couple balancer X1 is arranged in the lower half body 4D of the crankcase. With this structure, since the occupation of the internal space in the crankcase 4 is suppressed by arranging the left upper balancer shaft 30 as the drive shaft of the first inertial force balancer Y1 in the upper half body 4U of the crankcase 4, the upper portion of the crankcase 4 is downsized, and also the space for arranging the components of the transmission, the starter or the like is easily ensured in the upper portion of the crankcase 4.

Also, in the balancer device 100 according to this embodiment, the left upper balancer shaft 30 as the drive shaft of the first inertial force balancer Y1 is arranged behind the crankshaft 5, and the lower balancer shaft 31 as the drive shaft of the combined balancer Z1 and the first couple balancer X1 is arranged in front of the crankshaft 5. In this case, the drive shaft of the first inertial force balancer Y1 with the drive shaft shortened is arranged behind the crankshaft 5 and the occupation of the internal space behind the crankshaft 5 is suppressed, so that, for example, the shaft members of the transmission, the starter or the like are easily brought close to the crankshaft 5.

Next, a vehicle engine including a balancer device for a parallel twin cylinder internal combustion engine according to a second embodiment of the present invention will be described with reference to FIG. 11 to FIG. 13. The same constituent elements as those in the first embodiment are shown by the same reference signs, and the explanation thereof is omitted.

Figure 11:
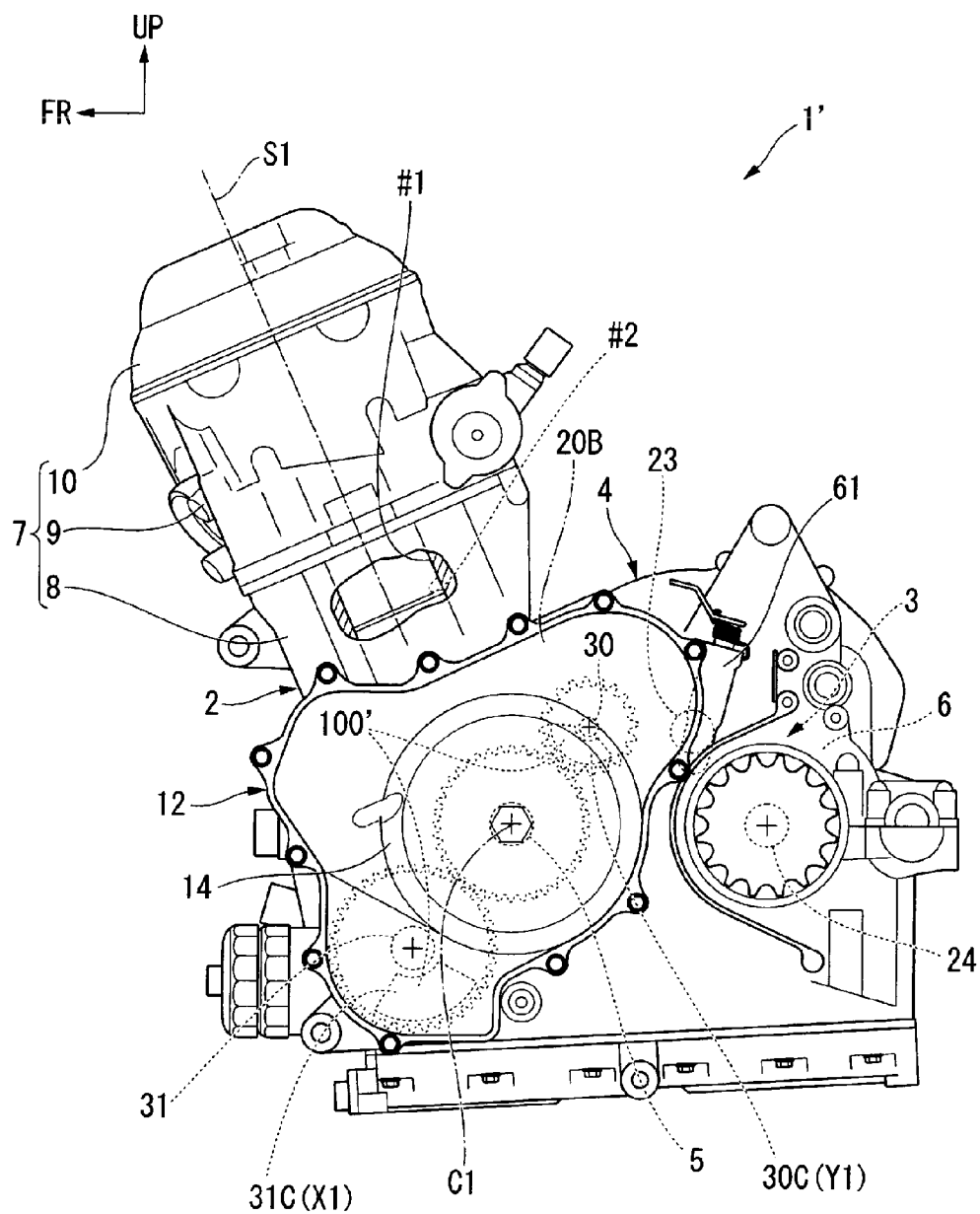
FIG. 11 is a left side view of a vehicle engine including a blander device for a parallel twin cylinder internal combustion engine according to a second embodiment of the present invention.
Figure 12:
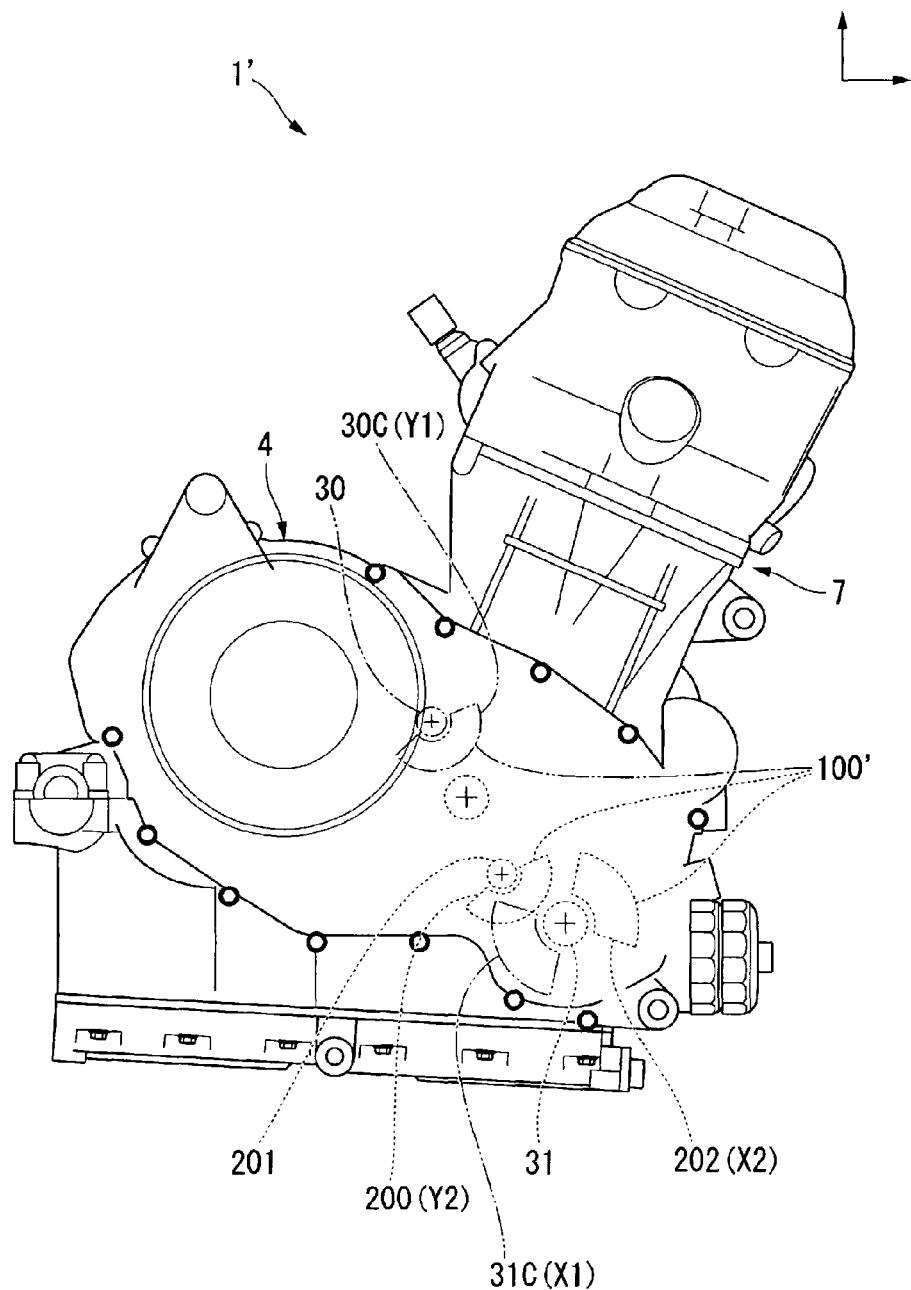
FIG. 12 is a right side view of the vehicle engine according to the second embodiment.
Figure 13:
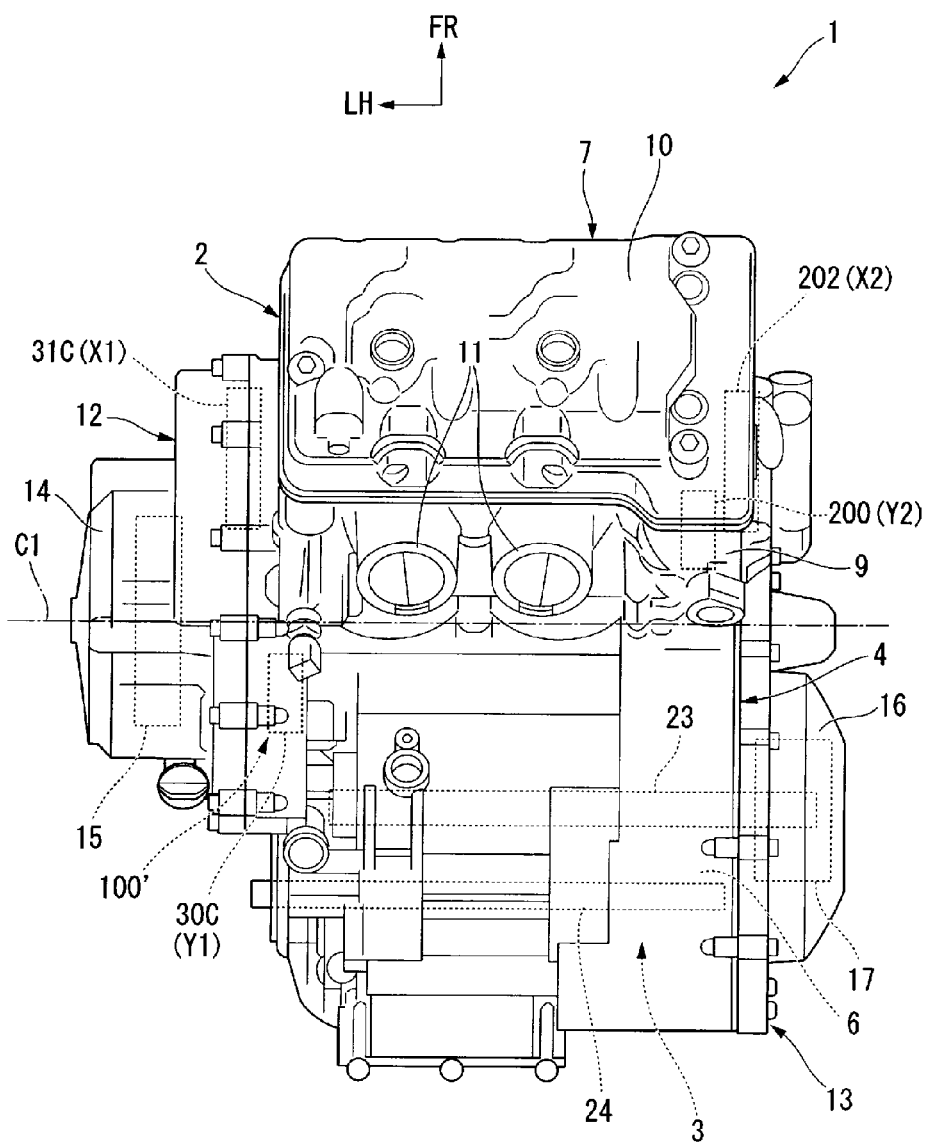
FIG. 13 is a plan view of the vehicle engine according to the second embodiment.

A vehicle engine 1' shown in FIG. 11 to FIG. 13 is mounted with a balancer device 100' composed of four balancers. The balancer device 100' includes the first inertial force balancer Y1, the second inertial force balancer Y2, the first couple balancer X1 and the second couple balancer X2 without composing the combined balancer Z1 as in the first embodiment. These four balancers are set to satisfy "the conditions for the cancellation of the inertial force" and "the conditions for the cancellation of the couple" as described in the first embodiment.

Note that also in the vehicle engine 1', the left crankpin 5PL and the right crankpin 5PR shown in FIG. 5 or the like are arranged on the crankshaft 5 at the phase angle of 90 degrees around the crankshaft 5, and the right crankpin 5PR is configured to be positioned on the advance side of the crankshaft 5 by 90 degrees in comparison with the left crankpin 5PL.

The first inertial force balancer Y1 and the first couple balancer X1 are the same as those in the first embodiment, the first inertial force balancer Y1 is composed of the left upper balancer 30C, and the first couple balancer X1 is composed of the left lower balancer 31C. Therefore, the explanation thereof is omitted. Note that for the sake of convenience of explanation, the left upper balancer 30C shown in the drawing is shown smaller than that in the first embodiment.

On the other hand, with reference to FIG. 12 and FIG. 13, the second inertial force balancer Y2 is composed of a right upper balancer 200, and is driven by a right upper balancer shaft 201. Also, the second couple balancer X2 is composed of a right lower balancer 202, and is driven by the lower balancer shaft 31 in common with the first couple balancer X1. Note that the right lower balancer 202 may be formed integrally with the lower balancer shaft 31 or may be formed separately therefrom. Also, in FIG. 12, for the sake of convenience of explanation, the first inertial force balancer Y1 and the first couple balancer X1 are shown by the two-dot chain line.

With reference to FIG. 9(B) again, the second inertial force balancer Y2 is set to generate the force of the BR2. That is, the second inertial force balancer Y2 is set such that the amount of unbalance with respect to the reciprocation section including the piston 72R is set to mr cos(θ/2), and the force facing the second inertial force compound Fy2 is generated at the position of π+θ/2 in the balancer drive shaft rotational direction (the rotational direction opposite to the rotational direction of the crankshaft 5) from the angle bisector DL.

Specifically, the second inertial force balancer Y2 is set such that, for example, in a mass m cos(θ/2), a distance from the center of the balancer shaft to the center of gravity thereof is set to a reference sign r or the like, and when the piston 72L is at the top dead center, the center of gravity thereof is directed to the position of π+θ/2 in the rotational direction (the rotational direction opposite to the rotational direction of the crankshaft 5) of the right upper balancer shaft 201 from the angle bisector DL so as to perform the inverse rotation with the same period as the crankshaft 5.

Note that the amount of unbalance of the first inertial force balancer Y1, with respect to the reciprocation section including the piston 72L, and the amount of unbalance of the second inertial force balancer Y2, with respect to the reciprocation section including the piston 72R, are equal to each other.

Also, the second couple balancer X2 is set such that the force of the BR3 is generated, the amount of unbalance with respect to the reciprocation section including the piston 72R is set to β, and the force facing the second couple compound Fx2 is generated at the position of 3π/2+θ/2 in the balancer drive shaft rotational direction (the rotational direction opposite to the rotational direction of the crankshaft 5) from the angle bisector DL.

Specifically, the second couple balancer X2 is set such that, for example, in a mass β/r, the distance from the center of the balancer shaft to the center of gravity thereof is set to a reference sign r or the like, and when the piston 72L is at the top dead center, the center of gravity thereof is directed to the position of 3π/2+θ/2 in the rotational direction (the rotational direction opposite to the rotational direction of the crankshaft 5) of the lower balancer shaft 31 from the angle bisector DL so as to perform the inverse rotation with the same period as the crankshaft 5.

The first inertial force balancer Y1 and the second inertial force balancer Y2 are arranged to be positioned symmetrical to each other around the bisection point P1 in the planar view.

Also, the first couple balancer X1 and the second couple balancer X2 are coaxially arranged on the shaft extending parallel to the crankshaft 5 (that is, arranged on the lower balancer shaft 31), and are arranged symmetrical at 180 degrees about the shaft.

Further, in the common shaft (the lower balancer shaft 31) for the first couple balancer X1 and the second couple balancer X2, a reference sign x represents a distance to the position of the first couple balancer X1 from a point P2 with which a straight line intersects, the straight line being passed through the bisection point P1 and perpendicular to the crankshaft 5, a reference sign l represents a distance between the position of the first couple balancer X1 and the position of the second couple balancer X2, and a reference sign L represents a length of the segment for connecting the center of the first cylinder #1 to the center of the second cylinder #2. In this case, the following relation between α and β is set to be effect.

$$\alpha = 2mr\sin(\theta/2) \times (L/x) - \beta(l/x-1)$$

$$\beta = 2mr\sin(\theta/2) \times (L/(l-x)) - \alpha(l/(l-x))$$

Also in the balancer device 100' according to the second embodiment as described above, since the vibratory force of the primary vibration generated with the same period as the rotation of the crankshaft is resolved into two directions, that is, into the inertial force component and the couple component, and the inertial force balancer and the couple balancer are set to face the inertial force component and the couple component, the primary vibration is reduced. Also, if the inertial force balancer satisfies conditions that the inertial force balancer faces the inertial force component and the inertial force component is reduced and the couple balancer satisfies conditions that the couple balancer faces the couple component and the couple component is reduced, setting of mass and layout of the respective balancers are comparatively flexibly performed, and the degree of freedom in layout of the respective balancers is improved. As a result, the degree of freedom in layout of the parallel twin cylinder internal combustion engine is improved.

Specifically, although the balancer device 100' includes the four balancers, the two inertial force balancers are configured to have mutually different short drive shafts, and to prevent the drive shafts of the balancers from occupying the internal space of the parallel twin cylinder internal combustion engine (the crankcase 4). As a result, the degree of freedom in layout of the parallel twin cylinder internal combustion engine is improved. Also, if in the two couple balancers, force facing the couple component is generated in a symmetrical relation through 180 degrees, mass is changed to adjust the layout. As a result, the degree of freedom in layout of the parallel twin cylinder internal combustion engine is improved.

Note that in this embodiment, θ is 90 degrees; however, in the case of (0 degree)<θ<(180 degrees), the primary vibration is appropriately reduced by setting the four balancers in the same way.

In the parallel twin cylinder internal combustion engine, when the phase angles between the left crankpin 5PL and the right crankpin 5PR as shown in FIG. 6 or the like is (180 degrees)<θ<(360 degrees) around the crankshaft 5 and the four balancers are provided, with the aid of FIG. 9(B), the primary vibration is appropriately reduced by satisfying the following conditions for cancellation of inertial force and conditions for cancellation of couple.

Conditions for Cancellation of Inertial Force (180 Degrees)<θ<(360 Degrees):

(1) The magnitude of the force of the BR1 is mrω² cos(θ/2), and the BR1 generates the force facing the first inertial force component Fy1 at a position of θ/2 in a balancer drive shaft rotational direction (the rotational direction opposite to the rotational direction of the crankshaft 5) from the angle bisector DL.

(2) The magnitude of the force of the BR2 is mrω² cos(θ/2), and the BR2 generates the force facing the second inertial force component Fy2 at the position of θ/2 in the balancer drive shaft rotational direction (the rotational direction opposite to the rotational direction of the crankshaft 5) from the angle bisector DL.

(3) While the BR1 and the BR2 satisfy the conditions as set above, the positions with the force of the BR1 and the force of the BR2 generated are positioned symmetrical to each other around the bisection point P1 positioned at the center of the crankshaft 5 on the plane that bisects the segment for connecting the center of the first cylinder #1 to the center of the second cylinder #2 and that is perpendicular to the segment in the planar view.

Conditions for Cancellation of Couple (180 Degrees)<θ< (360 Degrees):

(1) The magnitude of the force of the BR3 is $\alpha\omega^2$, and the BR3 generates the force facing the first couple component Fx1 at a position of $\pi/2+\theta/2$ in the balancer drive shaft rotational direction (the rotational direction opposite to the rotational direction of the crankshaft 5) from the angle bisector DL.

(2) The magnitude of the force of the BR4 is $\beta\omega^2$, and the BR4 generates the force facing the second couple component Fx2 at the position of $\theta/2-\pi/2$ in the balancer drive shaft rotational direction (the rotational direction opposite to the rotational direction of the crankshaft 5) from the angle bisector DL.

(3) While the BR3 and the BR4 satisfy the conditions as set above, the positions with the force of the BR3 and the force of the BR4 generated are arranged coaxially with each other with respect to the shaft extending in the direction parallel to the crankshaft 5, and the directions of each force are symmetric through 180 degrees around the shaft. Note that a coaxial relation may be the case that the positions are arranged on the common shaft or the case that the positions are arranged on shafts separated from each other.

(4) In the common shaft for the BR3 and the BR4, a reference sign x represents a distance to a position with the BR3 generated from a point P2 with which a straight line intersects, the straight line being passed through the bisection point P1 and perpendicular to the crankshaft 5, a reference sign l represents a distance between the position with the BR3 generated and the position with the BR4 generated, and a reference sign L represents a length of the segment for connecting the center of the first cylinder #1 to the center of the second cylinder #2. In this case, the following relation is effect between α and β.

$$\alpha=2mr\sin(\theta/2)\times(L/x)-\beta(l/x-1)$$

$$\beta=2mr\sin(\theta/2)\times(L/(l-x))-\alpha(l/(l-x))$$

Note that in the case of (180 degrees)<θ<(360 degrees) and the three balancers are provided, the same conditions as the combination condition and compound conditions as described in the first embodiment are determined based on the above-described conditions for the cancellation of the inertial force ((180 degrees)<θ<(360 degrees)) and conditions for the cancellation of the couple ((180 degrees)<θ<(360 degrees)).

Although embodiments of the present invention have been described above, the present invention is not limited to the above-described embodiments, and various modifications may be made within the scope not departing from the gist of the present invention.

For example, in the first embodiment, the example that all the combined balancer Z1, the first inertial force balancer Y1 and the first couple balancer X1 are arranged outside of the crankcase 4 has been described; however, at least any of the balancers may be arranged inside of the crankcase 4.

Also, in the second embodiment, the explanation of the positions of the first inertial force balancer Y1, the second inertial force balancer Y2, the first couple balancer X1 and the second couple balancer X2 in the relation with the crankcase 4 has been omitted; however, the balancers may be arranged outside of the crankcase 4 or may be arranged inside of the crankcase. Also, the first inertial force balancer Y1 and the second inertial force balancer Y2 may be arranged outside of the crankcase 4, and may be supported by the crankcase 4 and the left crankcase cover 12 or the right crankcase cover 13.

Also, in the first embodiment, the example that the combined balancer Z1 is arranged on the right side of the crankcase 4 has been described; however, the combined balancer may be arranged on the left side of the crankcase 4 based on the combination of the BR1 and the BR3. On the right side of the crankcase 4, the second inertial force balancer Y2 based on the BR2 may be arranged, and the second couple balancer X2 based on the BR4 may be arranged.

Also, in this embodiment, the balancer device for reducing the vibratory force generated in the parallel twin cylinder internal combustion engine having the crank phase angle of 270 degrees has been described; however, in the present invention, the balancer device is effective for the parallel twin cylinder internal combustion engine with the crank phase angle set at irregular intervals within the range of (0 degree)< θ<(180 degrees) and (180 degrees)<θ<(360 degree). Specifically, in the present invention, the vibratory force is effectively reduced even in the parallel twin cylinder internal combustion engine having a 315-degree phase crank or the like in addition to so-called 270-degree phase crank according to the embodiment. Consequently, the degree of freedom in layout of the parallel twin cylinder internal combustion engine in such a case is improved.

REFERENCE SIGNS LIST

1, 1' . . . Vehicle engine
2 . . . Internal combustion engine
4 . . . Crankcase
4U . . . Upper half body
4D . . . Lower half body
5 . . . Crankshaft
5PL . . . Left crankpin (first crankpin)
5PR . . . Right crankpin (second crankpin)
8 . . . Cylinder block
12 . . . Left crankcase cover (crankcase cover)
13 . . . Right crankcase cover (crankcase cover)
30 . . . Left upper balancer shaft (drive shaft)
31 . . . Lower balancer shaft (drive shaft)
72L . . . Piston (first piston)
72R . . . Piston (second piston)
100, 100' . . . Balancer device
F1 . . . First cylinder vibratory force
F2 . . . Second cylinder vibratory force
DL . . . Angle bisector
Y1 . . . First inertial force balancer (inertial force balancer)
Y2 . . . Second inertial force balancer (inertial force balance)
X1 . . . First couple balancer (couple balancer)
X2 . . . Second couple balancer (couple balancer)
Z1 . . . Combined balancer (inertial force balancer, couple balancer)
P1 . . . Bisection point
1 . . . First cylinder
2 . . . Second cylinder
θ . . . Predetermined phase angle

The invention claimed is:

1. A parallel twin cylinder internal combustion engine comprising:
 a balancer device disposed inside the parallel twin cylinder internal combustion engine;
 a common crankshaft having a first crankpin and a second crankpin disposed at a predetermined phase angle; and
 a cylinder block having a first cylinder corresponding to the first crankpin and a second cylinder corresponding to the second crankpin,
 wherein the balancer device is configured to reduce a first cylinder vibratory force and a second cylinder vibratory force which are generated when the crankshaft is rotated in the parallel twin cylinder internal combustion engine,
 wherein the first cylinder vibratory force generates force directed outward in a radial direction of the crankshaft while performing inverse rotation with the same period as the crankshaft based on a position where a first piston stored in the first cylinder is at a top dead center,
 wherein the second cylinder vibratory force generates force directed outward in the radial direction of the crankshaft while performing the inverse rotation with the same period as the crankshaft based on a position where a second piston stored in the second cylinder is at the top dead center,
 wherein when viewed in an axial direction of the crankshaft, a straight line for bisecting an angle formed between the first cylinder vibratory force and the second cylinder vibratory force is defined as an angle bisector,
 wherein the force with the first cylinder vibratory force and the force with the second cylinder vibratory force are resolved into an inertial force component resolved into a direction parallel to the angle bisector, and resolved into a couple component resolved into a direction parallel to a plane perpendicular to the angle bisector,
 wherein the balancer device comprises an inertial force balancer that is configured to generate force facing the inertial force component, and
 wherein the balancer device comprises a couple balancer that is configured to generate force facing the couple component.

2. The parallel twin cylinder internal combustion engine according to claim 1,
 wherein the inertial force balancer comprises a first inertial force balancer and a second inertial force balancer which have the equal amount of unbalance,
 the crankshaft is configured along a width direction of the parallel twin cylinder internal combustion engine,
 in a planar view, the first inertial force balancer and the second inertial force balancer are configured symmetrically with a bisection point positioned around the center of the crankshaft as the center, on a plane that bisects a segment for connecting the center of the first cylinder to the center of the second cylinder and that is perpendicular to the segment, and
 the couple balancer is configured in such a manner that a first couple balancer and a second couple balancer are configured coaxially with each other, and also are symmetrical at 180 degrees about the shaft.

3. The parallel twin cylinder internal combustion engine according to claim 2, wherein at least any one of the first inertial force balancer, the second inertial force balancer, the first couple balancer and the second couple balancer is configured outside of a crankcase.

4. The parallel twin cylinder internal combustion engine according to claim 3,
 wherein at least one of the first inertial force balancer and the second inertial force balancer is configured outside of the crankcase, and
 a drive shaft of at least one of the first inertial force balancer and the second inertial force balancer that are configured outside is supported by a side surface of the crankcase and a crankcase cover for covering the side surface of the crankcase.

5. The parallel twin cylinder internal combustion engine according to claim 2,
 wherein a combined balancer is composed by combining one of the first inertial force balancer and the second inertial force balancer with one of the first couple balancer and the second couple balancer, and
 in the planar view, the other of the first inertial force balancer and the second inertial force balancer, and the combined balancer are configured symmetrically with the bisection point positioned around the center of the crankshaft as the center, on the plane that bisects the segment for connecting the center of the first cylinder to the center of the second cylinder and that is perpendicular to the segment.

6. The parallel twin cylinder internal combustion engine according to claim 5, wherein the other of the first couple balancer and the second couple balancer, and the combined balancer are configured coaxially with each other.

7. The parallel twin cylinder internal combustion engine according to claim 5, wherein after an axial position of one of the first couple balancer and the second couple balancer is preliminarily determined, one of the first inertial force balancer and the second inertial force balancer is combined with one of the first couple balancer and the second couple balancer, and a phase of the combined balancer with respect to the other of the first couple balancer and the second couple balancer is set.

8. The parallel twin cylinder internal combustion engine according to claim 5, wherein the combined balancer, and at least one of the other of the first inertial force balancer and the second inertial force balancer and the other of the first couple balancer and the second couple balancer are configured outside of the crankcase.

9. The parallel twin cylinder internal combustion engine according to claim 8,
 wherein the other of the first inertial force balancer and the second inertial force balancer is configured outside of the crankcase, and
 the drive shaft of the other of the first inertial force balancer and the second inertial force balancer is supported by the side surface of the crankcase and the crankcase cover for covering the side surface of the crankcase.

10. The parallel twin cylinder internal combustion engine according to claim 8,
 wherein the combined balancer, and the other of the first couple balancer and the second couple balancer are configured outside of the crankcase, the combined balancer, and the other of the first couple balancer and the second couple balancer being configured coaxially with each other, and
 the combined balancer, and one of the other of the first couple balancer and the second couple balancer are formed integrally with a drive shaft thereof, the other thereof being separately fixed to the drive shaft by a fastening member.

11. The parallel twin cylinder internal combustion engine according to claim 5,
- wherein the crankcase has a vertically divided structure,
- the drive shaft of the other of the first inertial force balancer and the second inertial force balancer is arranged in an upper half body of the crankcase, and
- the drive shaft of the combined balancer and the other of the first couple balancer and the second couple balancer is configured in a lower half body of the crankcase.

12. The parallel twin cylinder internal combustion engine according to claim 5,
- wherein the drive shaft of the other of the first inertial force balancer and the second inertial force balancer is configured behind the crankshaft, and
- the drive shaft of the combined balancer and the other of the first couple balancer and the second couple balancer is configured in front of the crankshaft.

* * * * *